US011928818B2

United States Patent
Nikolskiy et al.

(10) Patent No.: US 11,928,818 B2
(45) Date of Patent: *Mar. 12, 2024

(54) OUT-OF-VIEW CT SCAN DETECTION

(71) Applicant: James R. Glidewell Dental Ceramics, Inc., Newport Beach, CA (US)

(72) Inventors: Sergey Nikolskiy, Coto de Caza, CA (US); Fedor Chelnokov, Khimki (RU); Grant Karapetyan, Moscow (RU)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,521

(22) Filed: Dec. 22, 2022

(65) Prior Publication Data

US 2023/0127540 A1 Apr. 27, 2023

Related U.S. Application Data

(63) Continuation of application No. 17/004,729, filed on Aug. 27, 2020, now Pat. No. 11,544,846.

(51) Int. Cl.
*G06T 7/00* (2017.01)
*G06T 7/73* (2017.01)

(52) U.S. Cl.
CPC .............. *G06T 7/0012* (2013.01); *G06T 7/73* (2017.01); *G06T 2207/10081* (2013.01); *G06T 2207/30036* (2013.01)

(58) Field of Classification Search
CPC ..................... G06T 7/0012; G06T 7/73; G06T 2207/10081; G06T 2207/30036
See application file for complete search history.

(56) References Cited

U.S. PATENT DOCUMENTS

| D302,683 S | 8/1989 | Iwasaki et al. |
| 5,023,895 A | 6/1991 | McCroskey et al. |
| 5,224,037 A | 6/1993 | Jones et al. |
| 5,270,827 A | 12/1993 | Kobyayashi et al. |
| 5,368,478 A | 11/1994 | Andreiko et al. |
| 5,431,562 A | 7/1995 | Andreiko et al. |

(Continued)

FOREIGN PATENT DOCUMENTS

| CN | 108024841 A | 5/2018 |
| CN | 108665533 A | 10/2018 |

(Continued)

OTHER PUBLICATIONS

Emiliano Perez et al., A Comparison of Hole-Filing Methods in 3D, Int. J. Appl. Math. Comput. Sci., 2016, vol. 26, No. 4, 885-903, in 19 pages.

(Continued)

*Primary Examiner* — Shefali D Goradia
(74) *Attorney, Agent, or Firm* — Charles Fowler

(57) ABSTRACT

Computer-implemented method and system automatically detects an out-of-view CT scan by receiving a voxel density file, determining a threshold iso-value of density between air density and a material density of one or more scanned objects in the voxel density file, and evaluating, using the threshold iso-value of density, one or more horizontal slices of the voxel density file to determine whether at least a portion of the one or more scanned objects is out of view.

16 Claims, 22 Drawing Sheets

(56) References Cited

U.S. PATENT DOCUMENTS

| | | | |
|---|---|---|---|
| 5,447,432 | A | 9/1995 | Andreiko et al. |
| 5,454,717 | A | 10/1995 | Andreiko et al. |
| 5,605,459 | A | 2/1997 | Kuroda et al. |
| D394,316 | S | 5/1998 | Kodama et al. |
| 5,879,158 | A | 3/1999 | Doyle et al. |
| 6,068,482 | A | 5/2000 | Snow |
| 6,081,739 | A | 6/2000 | Lemchen |
| 6,091,412 | A | 7/2000 | Simonoff et al. |
| 6,152,731 | A | 11/2000 | Jordan et al. |
| 6,198,552 | B1 | 3/2001 | Nagae |
| 6,217,334 | B1 | 4/2001 | Hultgren |
| 6,227,850 | B1 | 5/2001 | Chishti et al. |
| 6,244,861 | B1 | 6/2001 | Andreiko et al. |
| 6,318,994 | B1 | 11/2001 | Chishti et al. |
| 6,322,359 | B1 | 11/2001 | Jordan et al. |
| 6,343,108 | B1 | 1/2002 | Heuscher |
| 6,350,120 | B1 | 2/2002 | Sachdeva et al. |
| 6,371,761 | B1 | 4/2002 | Cheang et al. |
| 6,386,867 | B1 | 5/2002 | Durbin et al. |
| 6,386,878 | B1 | 5/2002 | Pavlovskaia et al. |
| 6,406,292 | B1 | 6/2002 | Chishti et al. |
| 6,409,504 | B1 | 6/2002 | Jones et al. |
| 6,450,807 | B1 | 9/2002 | Chishti et al. |
| 6,463,344 | B1 | 10/2002 | Pavloskaia et al. |
| 6,512,994 | B1 | 1/2003 | Sachdeva |
| 6,554,611 | B2 | 4/2003 | Chishti et al. |
| 6,582,225 | B1 | 6/2003 | Bergersen |
| D476,658 | S | 7/2003 | Adachi et al. |
| 6,602,070 | B2 | 8/2003 | Miller et al. |
| 6,621,491 | B1 | 9/2003 | Baumrind et al. |
| 6,632,089 | B2 | 10/2003 | Rubbert et al. |
| 6,633,789 | B1 | 10/2003 | Nikolskiy et al. |
| 6,648,640 | B2 | 11/2003 | Rubbert et al. |
| 6,688,886 | B2 | 2/2004 | Hughes et al. |
| 6,726,478 | B1 | 4/2004 | Isiderio et al. |
| 6,767,208 | B2 | 7/2004 | Kaza |
| 6,783,360 | B2 | 8/2004 | Chishti |
| 7,013,191 | B2 | 3/2006 | Rubbert et al. |
| 7,027,642 | B2 | 4/2006 | Rubbert et al. |
| 7,029,275 | B2 | 4/2006 | Rubbert et al. |
| 7,040,896 | B2 | 5/2006 | Pavlovskaia et al. |
| 7,068,825 | B2 | 6/2006 | Rubbert et al. |
| 7,080,979 | B2 | 7/2006 | Rubbert et al. |
| 7,085,342 | B2 | 8/2006 | Youmis et al. |
| 7,134,874 | B2 | 11/2006 | Chishti et al. |
| 7,140,877 | B2 | 11/2006 | Kaza |
| D533,555 | S | 12/2006 | Odhe et al. |
| 7,156,655 | B2 | 1/2007 | Sachdeva et al. |
| 7,234,937 | B2 | 6/2007 | Sachdeva et al. |
| 7,251,307 | B2 | 7/2007 | Chen |
| 7,277,595 | B1 | 10/2007 | Reid |
| 7,292,716 | B2 | 11/2007 | Kim |
| 7,330,528 | B2 | 2/2008 | Jefferson |
| 7,361,018 | B2 | 4/2008 | Imgrund et al. |
| 7,361,020 | B2 | 4/2008 | Abolfathi et al. |
| 7,373,286 | B2 | 5/2008 | Nikolskiy et al. |
| D573,146 | S | 7/2008 | Sukenari et al. |
| D580,962 | S | 11/2008 | Sukenari et al. |
| 7,476,100 | B2 | 1/2009 | Kuo |
| 7,545,372 | B2 | 6/2009 | Kopelman et al. |
| 7,609,875 | B2 | 10/2009 | Liu et al. |
| D612,851 | S | 3/2010 | Maruyama et al. |
| 7,717,708 | B2 | 5/2010 | Sachdeva et al. |
| 7,740,476 | B2 | 6/2010 | Rubbert et al. |
| 7,805,003 | B1 | 9/2010 | Cohen et al. |
| 7,940,884 | B2 | 5/2011 | Bruder et al. |
| 8,013,853 | B1 | 9/2011 | Douglas et al. |
| 8,045,180 | B2 | 10/2011 | Friemel |
| 8,075,306 | B2 | 12/2011 | Kitching et al. |
| 8,229,180 | B2 | 7/2012 | Baloch et al. |
| 8,308,481 | B2 | 11/2012 | DiAngelo et al. |
| 8,332,061 | B2 | 12/2012 | Baloch et al. |
| 8,342,843 | B2 | 1/2013 | Perot et al. |
| 8,380,644 | B2 | 2/2013 | Zouhar et al. |
| D678,383 | S | 3/2013 | Park et al. |
| 8,442,293 | B2 | 5/2013 | Bruder et al. |
| 8,723,866 | B2 | 5/2014 | Buyanovskiy |
| 8,724,880 | B2 * | 5/2014 | Shiki ................ G01S 7/52033 600/437 |
| 8,842,904 | B2 | 9/2014 | Chen |
| D714,940 | S | 10/2014 | Kim |
| 8,855,375 | B2 | 10/2014 | Macciola et al. |
| 8,995,732 | B2 | 3/2015 | Kaza et al. |
| 9,055,988 | B2 | 6/2015 | Galgut et al. |
| 9,135,498 | B2 | 9/2015 | Andreiko et al. |
| D742,010 | S | 10/2015 | Metcalf |
| 9,155,514 | B2 | 10/2015 | Panin et al. |
| 9,421,074 | B2 | 8/2016 | Sachdeva et al. |
| 9,495,769 | B2 | 11/2016 | Bruder et al. |
| 9,498,177 | B2 | 11/2016 | Bruder et al. |
| D776,818 | S | 1/2017 | Metcalf |
| 9,629,698 | B2 | 4/2017 | Lior et al. |
| 9,737,381 | B2 | 8/2017 | Lee |
| 9,888,983 | B2 | 2/2018 | Sachdeva et al. |
| 10,149,744 | B2 | 12/2018 | Lior et al. |
| 10,229,517 | B2 | 3/2019 | Raupach et al. |
| 10,624,717 | B2 | 4/2020 | Wen |
| 11,544,846 | B2 | 1/2023 | Nikolskiy et al. |
| 2002/0006217 | A1 | 1/2002 | Rubbert et al. |
| 2002/0028418 | A1 | 3/2002 | Farag et al. |
| 2002/0141626 | A1 | 10/2002 | Caspi |
| 2002/0150859 | A1 | 10/2002 | Imgrund et al. |
| 2003/0198377 | A1 | 10/2003 | Ng |
| 2003/0198378 | A1 | 10/2003 | Ng |
| 2003/0207227 | A1 | 11/2003 | Abolfathi |
| 2003/0207235 | A1 | 11/2003 | der Zel |
| 2003/0224314 | A1 | 12/2003 | Bergersen |
| 2004/0072120 | A1 | 4/2004 | Lauren |
| 2004/0146198 | A1 | 7/2004 | Herley |
| 2004/0152036 | A1 | 8/2004 | Abolfathi |
| 2004/0175671 | A1 | 9/2004 | Jones et al. |
| 2004/0183812 | A1 | 9/2004 | Raskar et al. |
| 2004/0197728 | A1 | 10/2004 | Abolfathi et al. |
| 2004/0214128 | A1 | 10/2004 | Sachdeva et al. |
| 2005/0018901 | A1 | 1/2005 | Kaufmann et al. |
| 2005/0019732 | A1 | 1/2005 | Kaufmann et al. |
| 2005/0030368 | A1 | 2/2005 | Morrison |
| 2005/0043837 | A1 | 2/2005 | Rubbert et al. |
| 2005/0089213 | A1 | 4/2005 | Geng |
| 2005/0089822 | A1 | 4/2005 | Geng |
| 2005/0191593 | A1 | 9/2005 | Knopp |
| 2005/0192835 | A1 | 9/2005 | Kuo et al. |
| 2005/0208449 | A1 | 9/2005 | Abolfathi et al. |
| 2005/0271996 | A1 | 12/2005 | Sporbert et al. |
| 2006/0127859 | A1 | 6/2006 | Wen |
| 2006/0147872 | A1 | 7/2006 | Andreiko |
| 2006/0154198 | A1 | 7/2006 | Durbin et al. |
| 2006/0263739 | A1 | 11/2006 | Sporbert et al. |
| 2006/0263741 | A1 | 11/2006 | Imgrund et al. |
| 2006/0275736 | A1 | 12/2006 | Wen et al. |
| 2007/0003900 | A1 | 1/2007 | Miller |
| 2007/0031790 | A1 | 2/2007 | Raby et al. |
| 2007/0031791 | A1 | 2/2007 | Cinader et al. |
| 2007/0065768 | A1 | 3/2007 | Nadav |
| 2007/0128573 | A1 | 6/2007 | Kuo |
| 2007/0128574 | A1 | 6/2007 | Kuo et al. |
| 2007/0129991 | A1 | 6/2007 | Kuo |
| 2007/0134613 | A1 | 6/2007 | Kuo et al. |
| 2007/0141527 | A1 | 6/2007 | Kuo et al. |
| 2007/0167784 | A1 | 7/2007 | Shekhar et al. |
| 2007/0168152 | A1 | 7/2007 | Matov et al. |
| 2007/0190481 | A1 | 8/2007 | Schmitt |
| 2007/0207441 | A1 | 9/2007 | Lauren |
| 2007/0238065 | A1 | 10/2007 | Sherwood et al. |
| 2008/0020350 | A1 | 1/2008 | Matov et al. |
| 2008/0048979 | A1 | 2/2008 | Ruttenberg |
| 2008/0057466 | A1 | 3/2008 | Jordan et al. |
| 2008/0064008 | A1 | 3/2008 | Schmitt |
| 2008/0182220 | A1 | 7/2008 | Chishti et al. |
| 2008/0248443 | A1 | 10/2008 | Chishti et al. |
| 2008/0261165 | A1 | 10/2008 | Steingart et al. |
| 2008/0305458 | A1 | 12/2008 | Lemchen |
| 2009/0080746 | A1 | 3/2009 | Xu et al. |
| 2009/0087817 | A1 | 4/2009 | Jansen et al. |

(56) References Cited

U.S. PATENT DOCUMENTS

| | | |
|---|---|---|
| 2009/0162813 A1 | 6/2009 | Glor et al. |
| 2009/0191503 A1 | 7/2009 | Matov et al. |
| 2009/0220916 A1 | 9/2009 | Fisker et al. |
| 2009/0246726 A1 | 10/2009 | Chelnokov et al. |
| 2009/0248184 A1 | 10/2009 | Steingart et al. |
| 2009/0298017 A1 | 12/2009 | Boerjes et al. |
| 2009/0311647 A1 | 12/2009 | Fang et al. |
| 2010/0009308 A1 | 1/2010 | Wen |
| 2010/0100362 A1 | 4/2010 | Zouhar et al. |
| 2010/0105009 A1 | 4/2010 | Karkar et al. |
| 2010/0111386 A1 | 5/2010 | El-Baz |
| 2010/0138025 A1 | 6/2010 | Morton et al. |
| 2010/0145898 A1 | 6/2010 | Malfliet et al. |
| 2010/0217567 A1 | 8/2010 | Marshall |
| 2010/0246918 A1 | 9/2010 | Kappler et al. |
| 2010/0260405 A1 | 10/2010 | Cinader, Jr. |
| 2010/0297572 A1 | 11/2010 | Kim |
| 2011/0002395 A1 | 1/2011 | Nishihara |
| 2011/0004331 A1 | 1/2011 | Cinader, Jr. et al. |
| 2011/0045428 A1 | 2/2011 | Boltunov et al. |
| 2011/0059413 A1 | 3/2011 | Schutyser et al. |
| 2011/0060438 A1 | 3/2011 | Stoddard et al. |
| 2011/0090513 A1 | 4/2011 | Seidl et al. |
| 2011/0142316 A1 | 6/2011 | Wang et al. |
| 2011/0164031 A1 | 7/2011 | Shi |
| 2011/0184762 A1 | 7/2011 | Chishti et al. |
| 2011/0206247 A1 | 8/2011 | Dachille et al. |
| 2011/0207072 A1 | 8/2011 | Schiemann |
| 2011/0244415 A1 | 10/2011 | Batesole |
| 2011/0268326 A1 | 11/2011 | Kuo et al. |
| 2011/0292047 A1 | 12/2011 | Chang et al. |
| 2012/0015316 A1 | 1/2012 | Sachdeva et al. |
| 2012/0065756 A1 | 3/2012 | Rubbert et al. |
| 2012/0088208 A1 | 4/2012 | Schulter et al. |
| 2012/0139142 A1 | 6/2012 | Van der Zel |
| 2012/0170822 A1 | 7/2012 | Litvin et al. |
| 2012/0214121 A1 | 8/2012 | Greenberg |
| 2013/0172731 A1 | 7/2013 | Gole |
| 2013/0218531 A1 | 8/2013 | Deichmann et al. |
| 2013/0226534 A1 | 8/2013 | Fisker et al. |
| 2013/0275107 A1 | 10/2013 | Alpern et al. |
| 2013/0325431 A1 | 12/2013 | See et al. |
| 2013/0329020 A1 | 12/2013 | Kriveshko et al. |
| 2013/0335417 A1 | 12/2013 | McQueston et al. |
| 2014/0003695 A1 | 1/2014 | Dean et al. |
| 2014/0055135 A1 | 2/2014 | Nielsen et al. |
| 2014/0067334 A1 | 3/2014 | Kuo |
| 2014/0067337 A1 | 3/2014 | Kopleman |
| 2014/0185742 A1 | 7/2014 | Chen et al. |
| 2014/0272772 A1 | 9/2014 | Andreiko et al. |
| 2014/0278278 A1 | 9/2014 | Nikolskiy et al. |
| 2014/0278279 A1 | 9/2014 | Azernikov et al. |
| 2014/0308624 A1 | 10/2014 | Lee et al. |
| 2014/0329194 A1 | 11/2014 | Sachdeva et al. |
| 2014/0379356 A1 | 12/2014 | Sachdeva et al. |
| 2015/0049081 A1 | 2/2015 | Coffey et al. |
| 2015/0056576 A1 | 2/2015 | Nikolskiy et al. |
| 2015/0111168 A1 | 4/2015 | Vogel |
| 2015/0154678 A1 | 6/2015 | Fonte et al. |
| 2015/0182316 A1 | 7/2015 | Morales et al. |
| 2015/0320320 A1 | 11/2015 | Kopelman et al. |
| 2015/0347682 A1 | 12/2015 | Chen et al. |
| 2016/0095668 A1 | 4/2016 | Kuo et al. |
| 2016/0135924 A1 | 5/2016 | Choi et al. |
| 2016/0148370 A1 | 5/2016 | Maury et al. |
| 2016/0163073 A1* | 6/2016 | Grass ................... G06T 11/006 382/131 |
| 2016/0239631 A1 | 8/2016 | Wu et al. |
| 2016/0256035 A1 | 8/2016 | Kopelman et al. |
| 2016/0256246 A1 | 9/2016 | Stapleton et al. |
| 2016/0367336 A1 | 12/2016 | Lv et al. |
| 2017/0100214 A1 | 4/2017 | Wen |
| 2017/0135655 A1 | 5/2017 | Wang et al. |
| 2017/0231721 A1 | 8/2017 | Akeel et al. |
| 2017/0340418 A1 | 11/2017 | Raanan |
| 2018/0028063 A1 | 2/2018 | Elbaz et al. |
| 2018/0028064 A1* | 2/2018 | Elbaz ................... H04N 13/221 |
| 2018/0028065 A1 | 2/2018 | Elbaz et al. |
| 2018/0055600 A1 | 3/2018 | Matov et al. |
| 2018/0132982 A1 | 5/2018 | Nikolskiy et al. |
| 2018/0146934 A1 | 5/2018 | Ripoche et al. |
| 2018/0165818 A1 | 6/2018 | Tsai et al. |
| 2018/0189420 A1 | 7/2018 | Fisker |
| 2018/0303581 A1 | 10/2018 | Martz et al. |
| 2020/0121429 A1 | 4/2020 | Pesach et al. |
| 2020/0178910 A1 | 6/2020 | Suzuki et al. |
| 2020/0205943 A1 | 7/2020 | Elbaz et al. |
| 2020/0405455 A1 | 12/2020 | Nikolskyi et al. |
| 2021/0077045 A1* | 3/2021 | Wen ................... A61B 6/5258 |

FOREIGN PATENT DOCUMENTS

| | | | |
|---|---|---|---|
| EP | 825457 A3 | 2/2002 | |
| EP | 2345387 A2 | 7/2011 | |
| EP | 2886077 A1 | 6/2015 | |
| WO | 0180761 A2 | 11/2001 | |
| WO | 2001080763 A2 | 11/2001 | |
| WO | 2013180423 A1 | 5/2013 | |
| WO | WO-2015014867 A1 * | 2/2015 | ........... G06K 9/2054 |
| WO | 2016097033 A1 | 6/2016 | |
| WO | 2017178908 A1 | 10/2017 | |
| WO | 2017191162 A1 | 11/2017 | |
| WO | 2018022054 A1 | 2/2018 | |
| WO | 2018038748 A1 | 3/2018 | |
| WO | 2018101923 A1 | 6/2018 | |

OTHER PUBLICATIONS

Yokesh Kumar et al., Automatic Feature Identification in Dental Meshes, ResearchGate, Article in Computer-Aided Design and Applications, Aug. 2013, in 24 pages.

Andrew W. Fitzgibbon et al., Direct Least Squares Fitting of Ellipses, Department of Artificial Intelligence, The University of Edinburgh, dated Jan. 4, 1996, in 15 pages.

Oscar Sebio Cajaraville, Four Ways to Create a Mesh for a Sphere, Dec. 7, 2015, in 9 pages.

Shuai Yang et al., Interactive Tooth Segmentation Method of Dental Model based on Geodesic, ResearchGate, Conference paper, Jan. 2017, in 6 pages.

Changhwan Kim et al., Efficient digitalization method for dental restorations using micro-CT data, nature.com/scientificreports, published Mar. 15, 2017, in 8 pages.

Dexter C. Kozen, The Design and Analysis of Algorithms, Texts and Monographs in Computer Science, (c) 1992, See Whole book.

Bob Sedgewick et al., Algorithms and Data Structures Fall 2007, Department of Computer Science, Princeton University, https://www.cs.princeton.edu/~rs/AlgsDS07/, downloaded Oct. 28, 2021, in 41 pages.

Alban Pages et al., Generation of Computational Meshes from MRI and CT-Scan data, ResearchGate, ESAIM: Proceedings, Sep. 2005, vol. 14, 213-223 in 12 pages.

William E. Lorensen et al., Marching Cubes: A High Resolution 3D Surface Construction Algorithm, Computer Graphics, vol. 21, No. 4, Jul. 1987 in 7 pages.

Alfred V. Aho et al., The Design and Analysis of Computer Algorithms, Addison-Wesley Publishing Company, Jun. 1974, pp. 124-155.

Sheng-hui Liao et al., Automatic Tooth Segmentation of Dental Mesh Based on Harmonic Fields, Hindawi Publishing Corporation, BioMed Research International, vol. 2015, Article ID 187173, in 11 pages.

Bribiesca, E. "3D-Curve Representation by Means of a Binary Chain Code", Mathematical and computer modelling 40.3(2004):285-295; p. 292, paragraph 2; p. 293, paragraph 1.

Kiattisin, S. et al. "A Match of X-Ray Teeth Films Using Image Processing Based on Special Features of Teeth", SICE Annual Conference, 2008. IEEE: Aug. 22, 2008; p. 97; col. 2, paragraph 2; a 98, col. 1-2.

(56) References Cited

OTHER PUBLICATIONS

Cui, M , Femiani, J., Hu, J., Wondka, Razada A. "Curve Matching for Open 2D Curves", Pattern Recognition Letters 30 (2009): pp. 1-10.

Gumhold, S., Wang, X., MacLeod R. "Feature Extraction From Point Clouds", Scientific Computing and Imaging Institute: pp. 1-13 Proceedings, 10th International Meshing Roundtable, Sandia National Laboratores, pp. 293-305, Oct. 7-10, 2001.

Wolfson, H. "On Curve Matching", Robotics Research Technical Report, Technical Report No. 256, Robotic Report No. 86 (Nov. 1986) New York University, Dept. of Computer Science, New York, New York 10012.

Rietzel et al., "Moving targets: detection and tracking of internal organ motion for treatment planning and patient set up", Radiotherapy and Oncology, vol. 73, supplement 2, Dec. 2004, pp. S68-S72.

Murat Arikan et al., O-Snap: Optimization-Based Snapping for Modeling Architecture, ACM Transactions on Grphics, vol. 32, No. 1, Article 6, Publication date: Jan. 2013, in 15 pages.

Brian Amberg et al., Optimal Step Nonrigid ICP Algorithms for Surface Registration, Proceedings/CVPR, IEEE Computer Society Conference on Computer Vision and Pattern Recognition, IEEE Computer Society Conference on Computer Vision and Pattern Recognition, Jun. 2007, in 9 pages.

T. Rabbani et al., Segmentation Of Point Clouds Using Smoothness Constraint, ISPRS vol. XXXVI, Part 5, Dresden Sep. 25-27, 2006, in 6 pages.

Kim et al., Efficient Digitalization Method For Dental Restorations Using Micro-CT Data, www.nature.com/scientificreports.com/, DOI: 10.1038/srep44577, Published Mar. 15, 2017, pp. 1-8.

Thomas Hollt, GPU-Based Direct Volume Rendering of Industrial CT Data, Universitat Koblenz Landau, VRVis Research Center, Koblenz, im Jul. 2007, in 84 pages.

Issa Ibraheem, Reduction of Artifacts in Dental Cone Beam CT Images to Improve the Three Dimensional Image Reconstruction, J. Biomedical Science and Engineering, 2012, 5, 409-415, published online Aug. 2012, Department of Biomedical Engineering, Damascus University, in 8 pages.

Kilic et al., GPU Supported Haptic Device Integrated Dental Simulation Environment, 2006, in 6 pages.

Zheng et al., Finite Difference Error Analysis of Geometry Properties of implicit Surfaces, 2011 IEEE Symposium on Computers & Informatics, 2011, Downloaded Nov. 23, 2021, from IEEE Xplore, in 6 pages.

A. C. Kak and Malcolm Slaney, Principles of Computerized Tomographic Imaging (Principles of Computerized Tomographic Imaging, IEEE Press, 1988), See whole book.

Maria Lyra et al., Filtering in SPECT Image Reconstruction, Hindawi Publishing Corporation, International Journal Biomedical Imaging, vol. 2011, Article IDS 693795, in 15 pages.

* cited by examiner

222

OUT-OF-VIEW CT SCAN DETECTION

RELATED APPLICATIONS

This application is a continuation of, and claims the benefit and priority to, U.S. patent application Ser. No. 17/004,729, filed Aug. 27, 2020, which is hereby incorporated by reference in its entirety.

BACKGROUND

A computed tomography scan ("CT scan") typically involves placing a physical object on a rotating platform inside a Computed Tomography scanner (CT scanner) between an x-ray source and x-ray detector and rotating the object around an axis of rotation to generate radiographs from the x-rays detected by the detector. Conventionally, the CT scanner can tomographically reconstruct the radiographs into a 3D representation of the object scanned ("CT reconstruction"). One example of CT reconstruction can be found in, for example, in the publication *Principles of Computerized Tomographic Imaging* (A. C. Kak and Malcolm Slaney, *Principles of Computerized Tomographic Imaging*, IEEE Press, 1988), the entirety of which is incorporated by reference herein. Other types of CT reconstruction can also be performed.

For proper tomographic reconstruction, relevant portions of the physical object ideally experience x-rays that are detected at every rotational position as the object is rotated during scanning. When the one or more physical objects are placed in the scanner, they may be shifted laterally or vertically so that relevant portions of the object to do not encounter x-rays that hit the detector at every rotational position. If relevant portions of the object do not encounter x-rays that hit the detector at one or more of the object's rotational positions, then the tomographic reconstruction can be missing, inaccurate, and/or difficult to see. Conventionally, it can be challenging to empirically determine whether the physical object was placed within the x-ray field of view to encounter x-rays that hit the detector at every rotation position.

SUMMARY

Disclosed is a computer-implemented method to automatically detect an out-of-view CT scan. The method can include receiving a voxel density file, determining a threshold iso-value of density between air density and a material density of one or more scanned objects in the voxel density file, and evaluating, using the threshold iso-value of density, one or more horizontal slices of the voxel density file to determine whether at least a portion of the one or more scanned objects is out of view.

Also disclosed is a system of automatically detecting an out-of-view CT scan. The system can include a processor, a computer-readable storage medium comprising instructions executable by the processor to perform steps including: receiving a voxel density file; determining a threshold iso-value of density between air density and a material density of one or more scanned objects in the voxel density file; and evaluating, using the threshold iso-value of density, one or more horizontal slices of the voxel density file to determine whether at least a portion of the one or more scanned objects is out of view.

Also disclosed is a non-transitory computer readable medium storing executable computer program instructions for automatically detecting an out-of-view CT scan, the computer program instructions including instructions for: receiving a voxel density file; determining a threshold iso-value of density between air density and a material density of one or more scanned objects in the voxel density file; and evaluating, using the threshold iso-value of density, one or more horizontal slices of the voxel density file to determine whether at least a portion of the one or more scanned objects is out of view.

DETAILED DESCRIPTION

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

Figure 1:
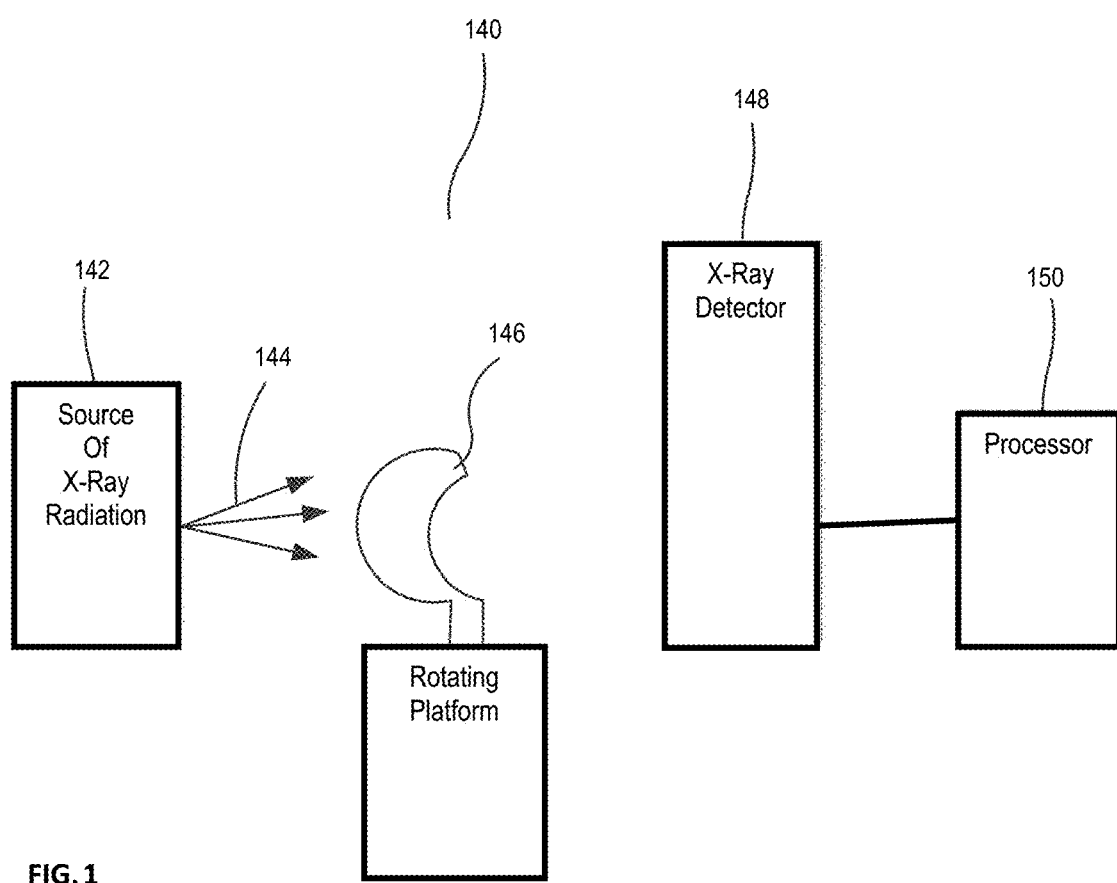
FIG. 1 shows an example of a schematic diagram of a computed tomography (CT) scanning system.

Some embodiments can include a computer-implemented method to automatically detect an out-of-view CT scan. A computed tomography (CT) scanner uses x-rays to make a detailed image of an object. A plurality of such images are then combined to form a 3D model of the object. A schematic diagram of an example of a CT scanning system 140 is shown in FIG. 1. The CT scanning system 140 includes a source of x-ray radiation 142 that emits an x-ray beam 144. In some embodiments, the source of x-ray radiation 142 can be a cone-beam x-ray source, for example. An object 146 being scanned is placed between the source 142 and an x-ray detector 148. In some embodiments, the object can be any object that can, for example, fit in a CT scanning system and be penetrated by x-rays. The x-ray detector 148, in turn, is connected to a processor 150 that is configured to receive the information from the detector 148 and to convert the information into a digital image file. Those skilled in the art will recognize that the processor 150 may comprise one or more computers that may be directly connected to the detector, wirelessly connected, connected via a network, or otherwise in direct or indirect communication with the detector 148.

An example of a suitable scanning system 140 includes a Nikon Model XTH 255 CT Scanner (Metrology) which is commercially available from Nikon Corporation. The example scanning system includes a 225 kV microfocus x-ray source with a 3 μm focal spot size to provide high performance image acquisition and volume processing. The processor 150 may include a storage medium that is configured with instructions to manage the data collected by the scanning system. A particular scanning system is described for illustrative purposes; any type/brand of CT scanning system can be utilized.

Figure 2:
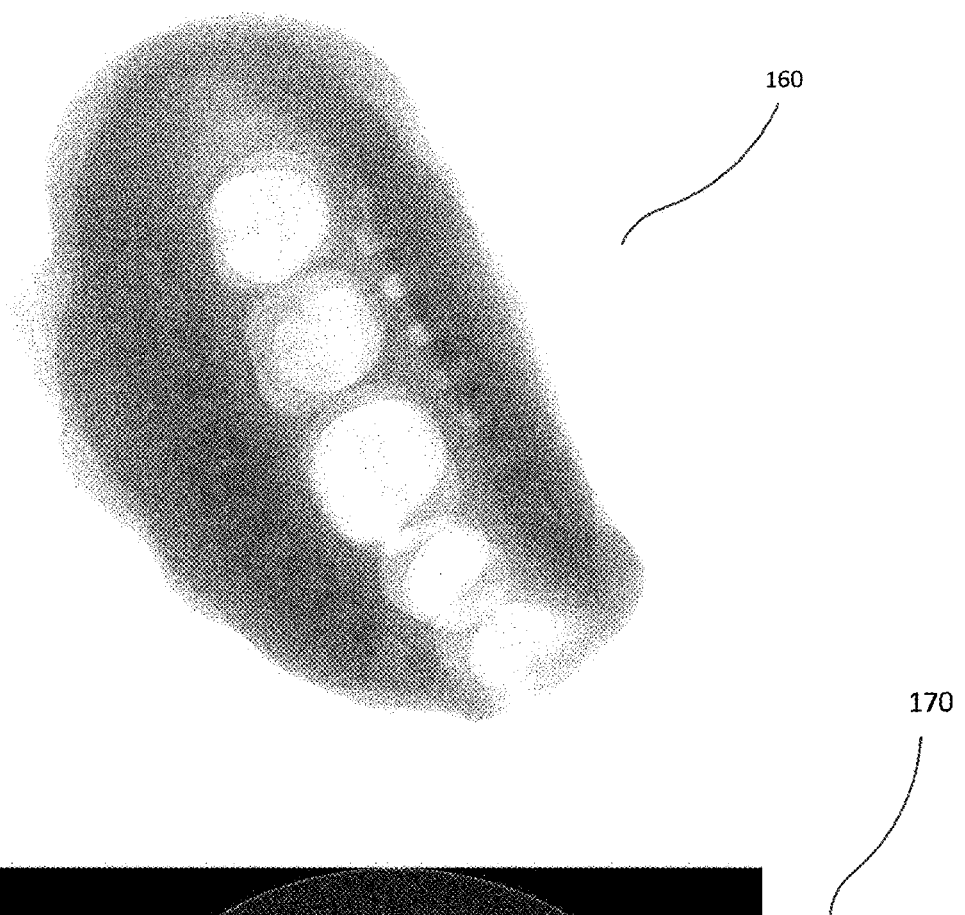
FIG. 2 shows an example of a 2-dimensional (2D) radiographic image of a dental impression tray containing a dental impression.

One example of CT scanning is described in U.S. Patent Application No. US20180132982A1 to Nikolskiy et al., which is hereby incorporated in its entirety by reference. As noted above, during operation of the scanning system 140, the object 146 is located between the x-ray source 142 and the x-ray detector 148. A series of images of the object 146 are collected by the processor 150 as the object 146 is rotated in place between the source 142 and the detector 146. An example of a single radiograph 160 is shown in FIG. 2. The radiograph 160 and all radiographs described herein are understood to be digital. In one embodiment, a series of 720 images can be collected as the object 146 is rotated in place between the source 142 and the detector 148. In other embodiments, more images or fewer images may be collected as will be understood by those skilled in the art. In some embodiments, radiographs can be referred to as projection images.

Figure 3:
FIG. 3 shows an example of a cross-section of a 3-dimensional (3D) volumetric image.

The plurality of radiographs 160 of the object 146 are generated by and stored within a storage medium contained within the processor 150 of the scanning system 140, where they may be used by software contained within the processor to perform additional operations. For example, in an embodiment, the plurality of radiographs 160 can undergo tomographic reconstruction in order to generate a 3D virtual image 170 (see FIG. 3) from the plurality of 2D radiographs 160 generated by the scanning system 140. In the embodiment shown in FIG. 3, the 3D virtual image 170 is in the form of a volumetric image or volumetric density file (shown in cross-section in FIG. 3) that is generated from the plurality of radiographs 160 by way of a CT reconstruction algorithm associated with the scanning system 140.

Figure 4A:
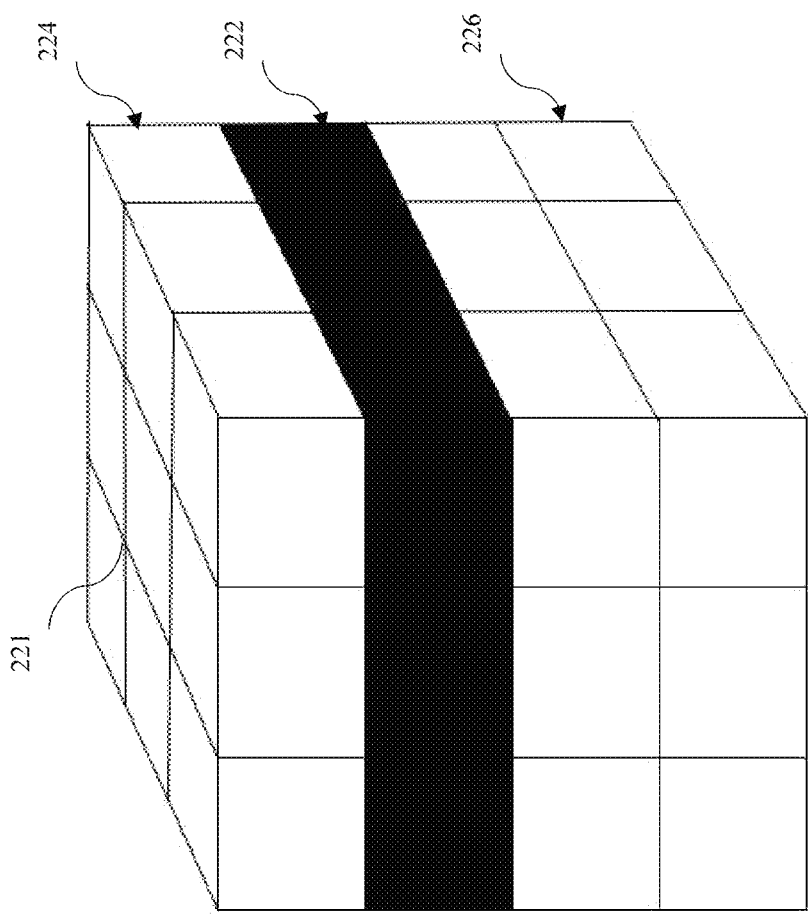
FIG. 4(a) shows a 3D illustration of an example volumetric image with multiple horizontal slices.

In some embodiments, the computer-implemented method can receive a voxel density file containing density information. In some embodiments, the voxel density file representing the reconstructed volume can be a 3 dimensional array or matrix. FIG. 4(a) shows an example illustration of portions of a voxel density file 220 in some embodiments. Each intersection of grid lines shown in the figure such as intersection 221 can include density information at that position. The voxel density file (volumetric density file) can in some embodiments, be a three-dimensional matrix (or array) of individual elements named voxels (abbreviation for volume elements). A slice of the voxel density file can be a two-dimensional subset of the reconstruction, for example. A horizontal slice can be, for example, all (x,y,z) voxels having an equal z-coordinate, for example, thus making the horizontal slice a two dimensional (x,y) matrix. In some embodiments, voxels can be referred to as pixels (picture elements).

Figure 4B:
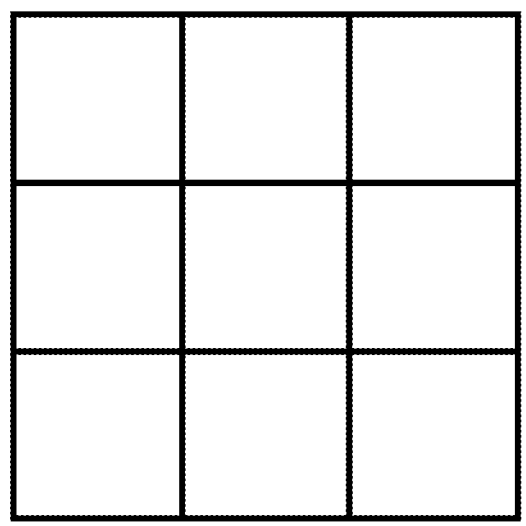
FIG. 4(b) shows a 2D illustration of a single horizontal slice.
Figure 4B:
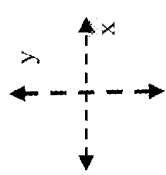

In some embodiments, the computer-implemented method can load and evaluate horizontal slices such as horizontal slice 222, top horizontal slice 224 and/or bottom horizontal slice 226. In the example figure, the horizontal slice 222, top horizontal slice 224, and bottom horizontal slice 226 are each in the x-y plane. As illustrated in the example shown in FIG. 4(b), the horizontal slice 222 can be square-shaped in some embodiments, having an equal number of rows and columns in the x-y plane. The number of slices/intersection points, height along the z axis, arrangement, size, orientation, and other aspects of the voxel density file can vary, and the example shown in the figure is for illustrative purposes only.

In some embodiments, the computer-implemented method can determine a threshold iso-value of density between air density and an object material density in the voxel density file. In some embodiments, the object material density can be a dental impression material density known in the art, for example. The iso-value can represent an iso-surface having the iso-value of density in the voxel density file and can therefore separate the volume on the inside part where density can be, for example, above the iso-value from the outside part, where density can be, for example, below the iso-value. In some embodiments, the threshold iso-value can include, for example, received. In some embodiments, the iso-value can be, for example, input by a user using a graphical user interface. In some embodiments, the iso-value can be, for example, loaded from an editable configuration file. In some embodiments, the iso-value can be, for example, determined automatically. An example of determining the iso-value automatically is disclosed in U.S. patent application Ser. No. 16/451,315 of Nikolskiy et al., the entirety of which is hereby incorporated by reference. In some embodiments, the computer-implemented method can apply the iso-value to the volumetric density file to generate an iso-surface. The iso-surface can represent the digital surface of one or more scanned objects.

In some embodiments, the computer-implemented method can evaluate, using the threshold iso-value of density, one or more horizontal slices of the voxel density file to determine whether at least a portion of the scanned physical dental impression is, for example, out of view.

Figure 5:
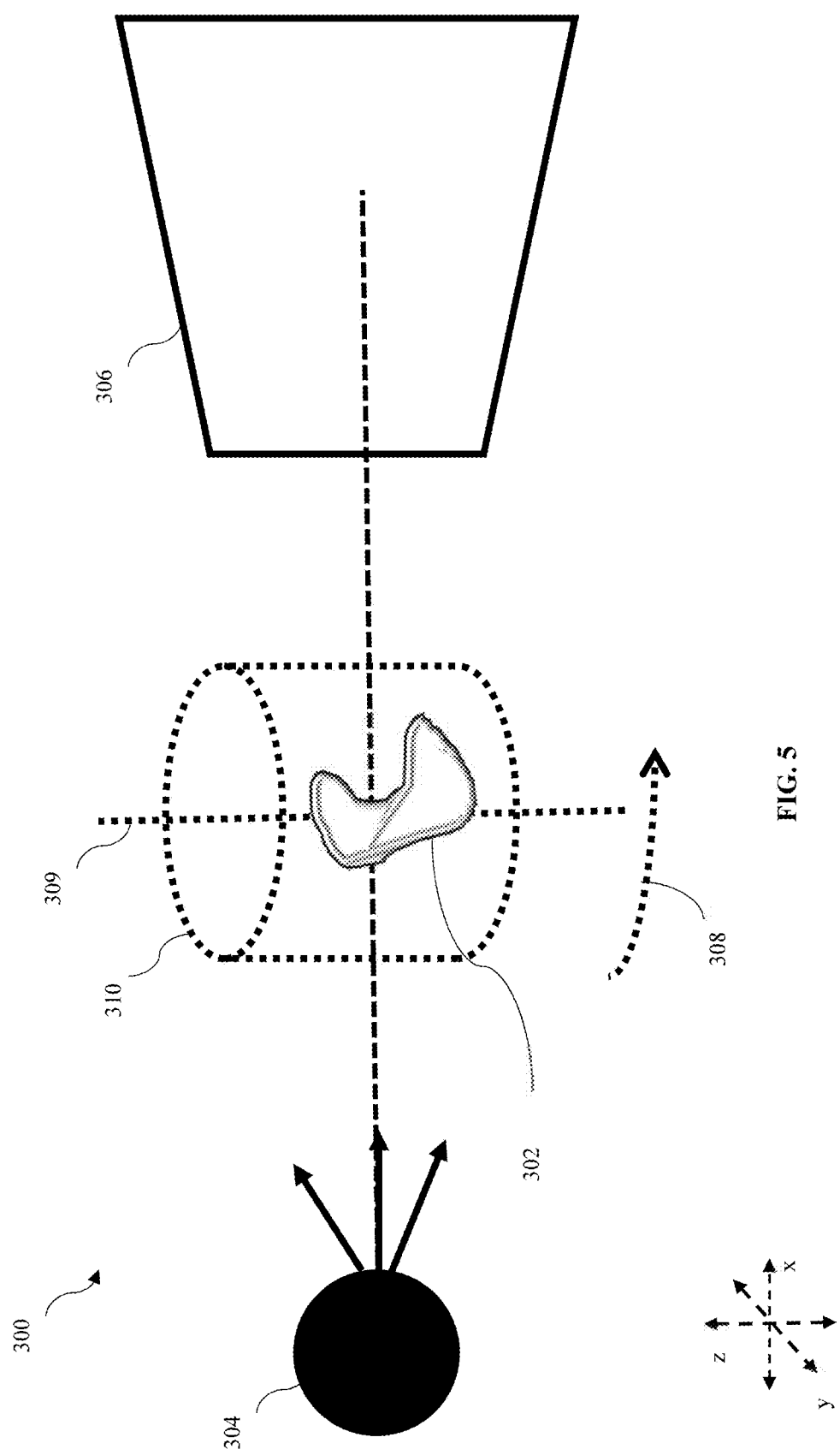
FIG. 5 shows a schematic 3D diagram illustration of an example of a CT scanning system.

FIG. 5 illustrates an example of a conventional CT scanning system 300 that can include one or more scanned objects 302 arranged between one or more x-ray sources 304 and a detector 306 such that at least a portion of the one or more scanned objects 302 within a view cylinder boundary 310 are irradiated by x-rays from the x-ray source 304 as they are rotated by a rotation direction 308 around an axis of rotation 309. The x-ray source 304 can be a cone-beam CT scanner (CBCT) in some embodiments. The rotation direction can be clockwise or counter-clockwise. The detector 306 can include an array of detection components in some embodiments. The view cylinder boundary 310 typically bounds the volume representing a field of view of the x-rays emitted from the x-ray transmitter 304 and detected on detector 306 as an object is rotated around the axis of rotation 309 during scanning.

In some embodiments, all points within the view cylinder boundary 310 are visible to the detector 306 at every rotational position of the scanned object and therefore appear in every projection as the object(s) 302 is/are rotated around the axis of rotation 309. In some embodiments, one or more points outside of the view cylinder boundary 310 are out of view in at least one rotational position. During scanning, as one or more objects are rotated, one or more portions of the one or more objects can be outside of the view cylinder boundary 310 at a particular rotational position. The one or more portions of the object(s) outside of the view cylinder boundary 310 at a particular rotational position are not registered on the detector 306 at that position. These physical objects or portions of physical objects can be considered out-of-view of the CT scan, and the iso-surface of the out-of-view object and/or one or more portions of the object can be missing, blurry, or inaccurate in the reconstructed surface image.

Figure 6A:
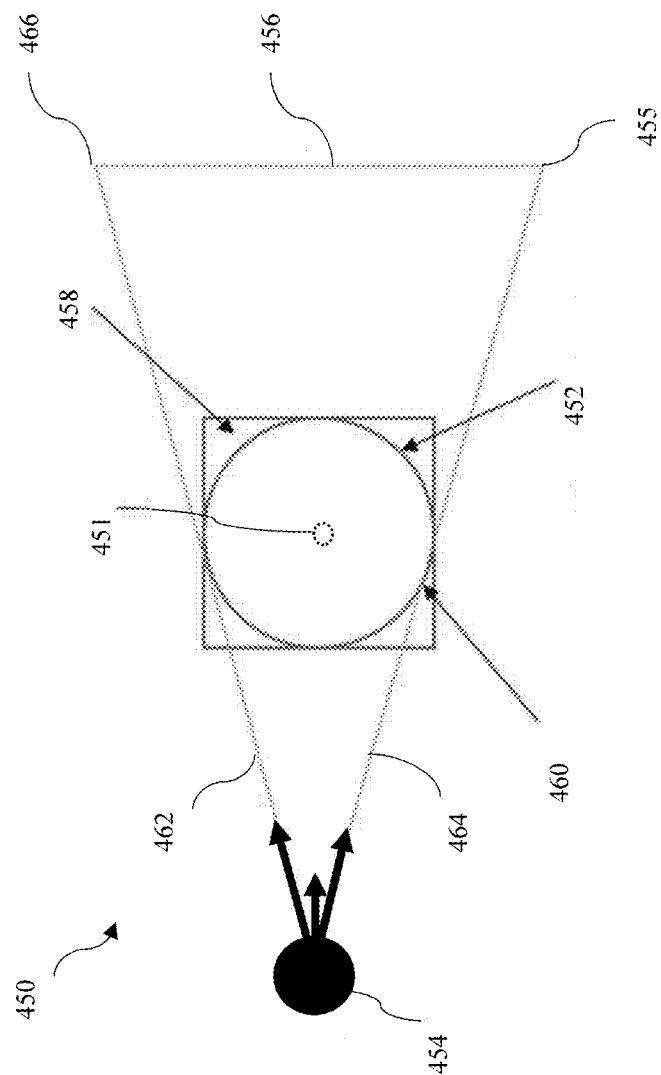
FIG. 6(a) shows an example of a schematic 2D diagram illustration of an example CT scanning system viewed from the top.

FIG. 6(a) illustrates a schematic diagram showing an example of a conventional CT scanning system 450 as seen from the top (in the x-y plane). One or more x-rays emitted from x-ray source 454 are detected at detector 456. For cone-beam x-rays emitted from CBCT scanners, the viewable field can be bounded (in the x-y plane) by a first boundary 462 extending between the x-ray source 454 and a first detector edge 466, by a second boundary 464 extending between the x-ray source 454 and a second detector edge 455, and by the detector 456. Any objects within this boundary will be detected by the detector 456. Any objects outside of the boundary will not be detected by the detector. In the example diagram, an object positioned to have an axis of rotation 451 will result in a reconstructed volume 458. Due to the first boundary 462 and the second boundary 464, however, the field of view is limited to be within the view cylinder 452. For example, first boundary 464 intersects the view cylinder 452 at intersection point 460.

Figure 6B:
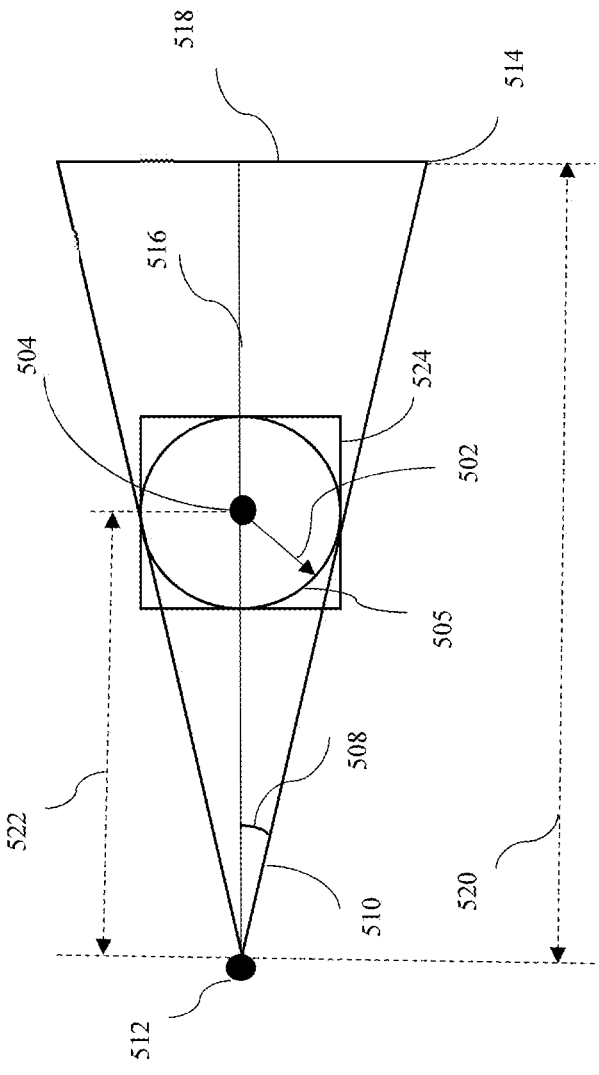
FIG. 6(b) shows an example of a schematic 2D diagram illustration of an example CT scanning system viewed from the top.
Figure 6B:
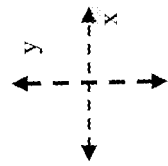

In some embodiments, the computer-implemented method can determine the view cylinder boundary based on the positions of the x-ray source, x-ray detector, and the axis of rotation between them as illustrated in FIG. 6(b). In some embodiments, the view cylinder boundary can be determined for each scan. This can be advantageous where source-to-axis distances vary (because the rotating element can be moved closer or further from the source) in some embodiments, for example. In some embodiments, the view cylinder boundary can be determined once and used for each scan, provided the source-to-axis distance remains the same for each scan, for example.

In some embodiments, the computer-implemented method can determine a lateral field of view boundary of the view cylinder boundary. In some embodiments, the lateral field of view boundary can be in the x-y plane, for example. In some embodiments, the lateral field of view boundary can be a circle, for example. For example, in some embodiments, the computer-implemented method can determine a lateral field of view boundary as a circle defined by a radius 502 that constitutes view cylinder boundary 505 extending from an axis of rotation 504. In some embodiments, the computer-implemented method can determine the radius 502 r as:

$$\tan \alpha = \frac{h}{D}, r = d \sin \alpha$$

For small angles:

$$r = \frac{hd}{D}$$

where α is an angle 508 between first boundary 510, which extends from x-ray source 512 to first detector edge 514 and a middle boundary 516 extending from x-ray source 512 to detector 518, h is ½ of the width of detector 518, D is the distance 520 from the x-ray source 512 to the detector 518, and d is a distance 522 from the x-ray source 512 to the axis of rotation 504. In some embodiments, the computer-implemented method can determine the radius 502 extending from the axis of rotation 504 to define the lateral field of view boundary which can be a circle when viewed in the x-y plane, for example. The reconstruction volume 524 can be generated using standard reconstruction techniques known in the art and can enclose the view cylinder boundary 505 in some embodiments, for example. In some embodiments, the computer-implemented method can determine a lateral out of view shift where one or more portions of one or more objects reside outside of the lateral field of view boundary at any rotational position.

Figure 7A:
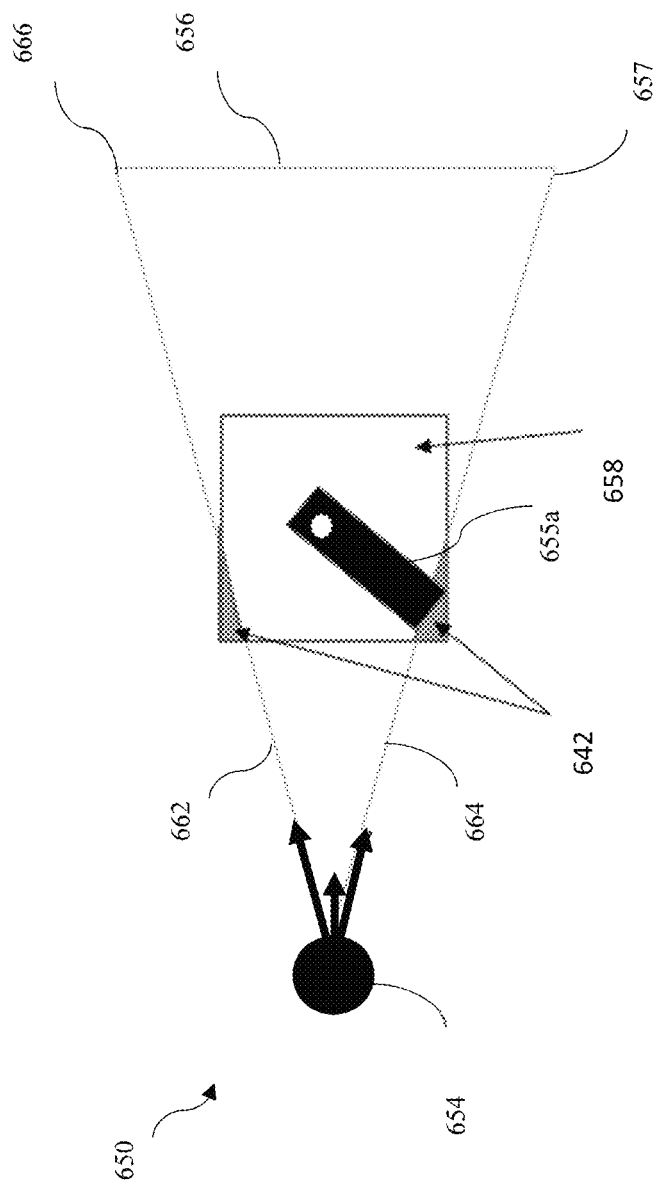
FIG. 7(a) shows an example of a schematic 2D diagram illustration of an example CT scanning system viewed from the top.
Figure 7B:
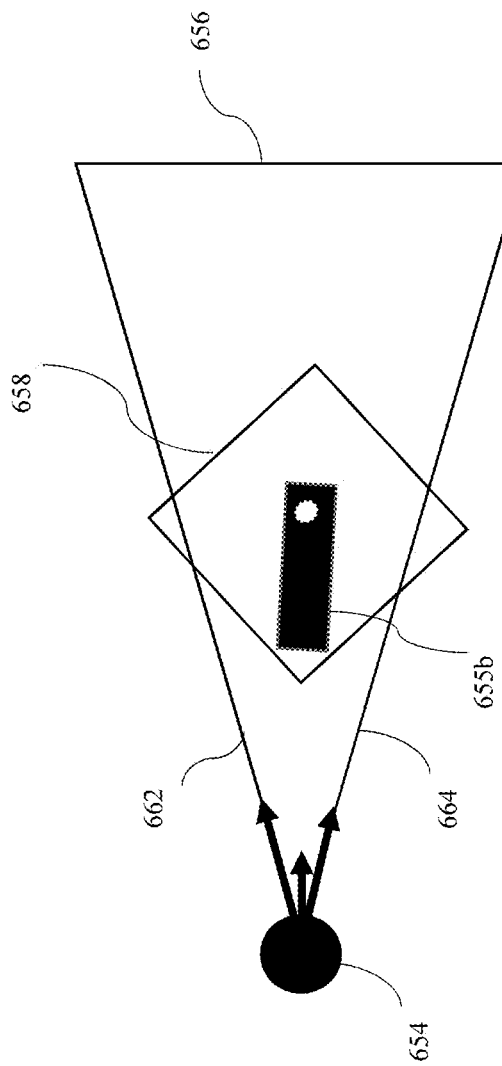
FIG. 7(b) shows an example of a schematic 2D diagram illustration of an example CT scanning system viewed from the top.

In some embodiments, evaluating can include the computer-implemented method determining a lateral out-of-view shift. In some embodiments, one or more portions of the object(s) can be laterally out-of-view, indicating a lateral out-of-view shift, for example. As illustrated in a CT scanning system 650 of FIG. 7(a), regions such as lateral out-of-view regions 642 are not detected by the detector 656 since they do not fall within the x-ray field of view bounded (in the x-y plane) by a first boundary 662 extending between the x-ray source 654 and a first detector edge 666, by a second boundary 664 extending between the x-ray source 654 and a second detector edge 657, and by the detector 656. If any portion of the one or more objects being scanned extends into the lateral out-of-view regions 642 at one or more rotational positions as the object is rotated during scanning, then the object is considered laterally out-of-view. For example, as illustrated in the FIG. 7(a), at least a portion of the object at rotational position 655a extends into an out-of-view region 642. When the object scan is reconstructed to generate the reconstructed voxel image 658, the laterally out-of-view region's digital surface in the voxel file can be either missing, distorted, blurry, or inaccurate, even if reconstruction algorithms attempt to fill in the missing data at the rotational position 655a. This distortion can occur even if the at least portion is within the x-ray field of view at another rotational position such as rotational position 655b as illustrated in FIG. 7(b), which depicts other elements from FIG. 7(a). This type of lateral out-of-view shift occurs in the x-y plane (for example, horizontal or sideways shift).

Figure 8:
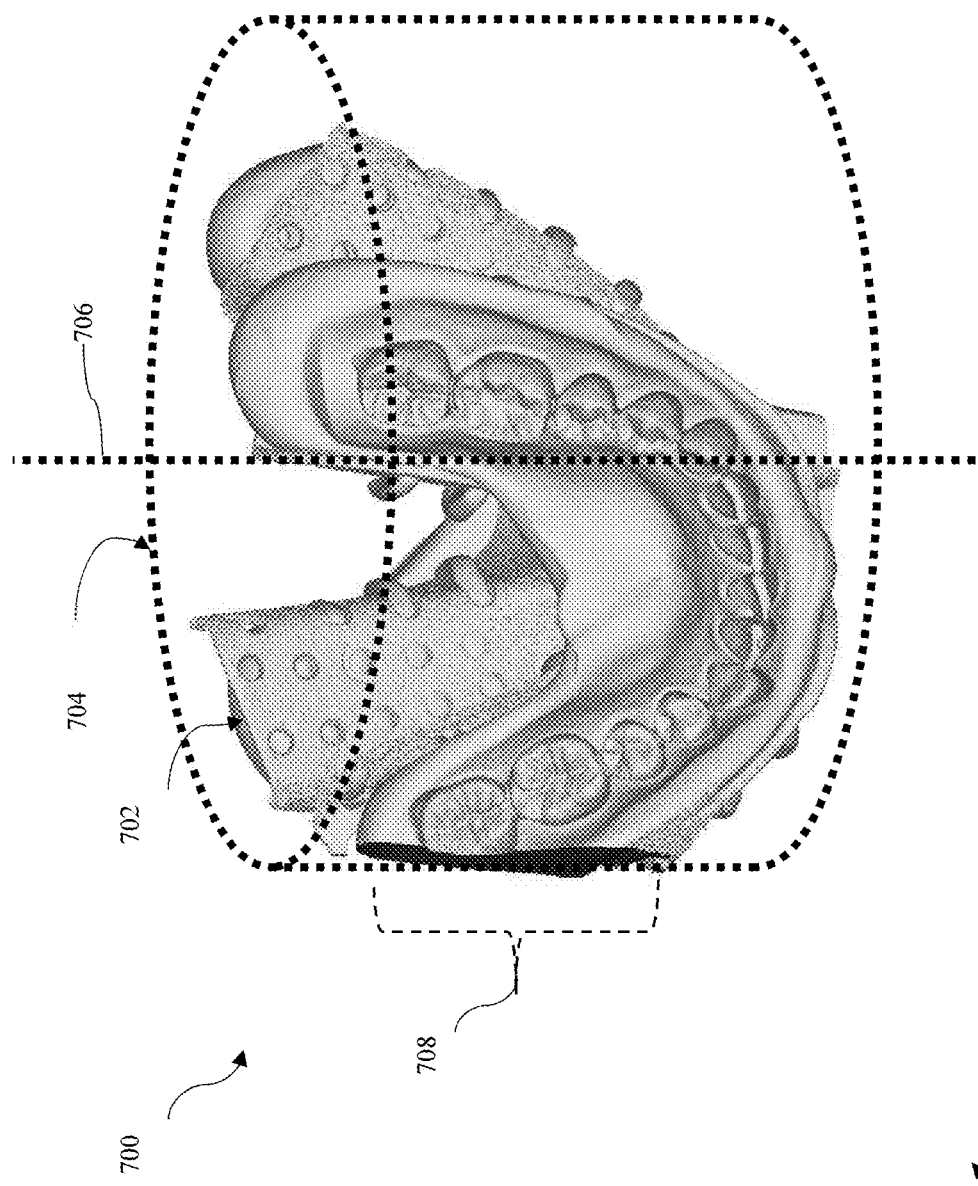
FIG. 8 shows an example of a 3D digital model with at least one lateral out of view portion.

FIG. 8 illustrates an example of an effect of a lateral out of view shift. A digital model 700 with an iso-surface 702. Also depicted for illustration purposes is view cylinder boundary 704. As illustrated in the figure, an out-of-view portion 708 arises because the object was not aligned to fall within the view cylinder boundary 704 during one or more rotational positions as the object(s) was/were rotated around an axis of rotation 706 during scanning. In this example, the out-of-view portion 706 was due to a lateral out-of-view shift of the object. This can refer to, for example, placement of the object outside of the view cylinder anywhere laterally, or in the x-y plane.

In some embodiments, determining a lateral out-of-view shift can include the computer implemented method determining a horizontal slice that includes a longest continuous arc of intersection between a view cylinder boundary and voxels above the threshold iso-value of density can include, for example, above a lateral out-of-view shift threshold. In some embodiments, the computer-implemented method can load one or more horizontal slices from the voxel density file at a particular iso-value and evaluate each horizontal slice based on a view cylinder boundary as described previously. In some embodiments, the computer-implemented method can determine a lateral field of view boundary as described in this disclosure. In some embodiments, the computer-implemented method can measure lengths of one or more arcs depicting at least a portion of a reconstructed image of a scanned object (based on iso-value of density) that intersects the lateral field of view boundary at one or more locations. The computer-implemented method can in some embodiments repeat evaluating each horizontal slice for arc intersection lengths. In some embodiments, the computer-implemented method can select the horizontal slice with the longest arc intersection length and determine whether the scan is out of view based on a lateral out-of-view shift threshold. In some embodiments, the lateral out-of-view shift threshold can be a percentage of the longest continuous arc of intersection length of a view cylinder boundary length (such as a lateral field of view boundary). For example, in some embodiments, the lateral out-of-view shift threshold can be, for example, at least 4%. That is, any longest arc that is at least 4% of the view cylinder boundary length (lateral field of view boundary length) would indicate the scanned object was laterally out-of-view. In some embodiments, the lateral out-of-view shift threshold can include, for example, a user-selectable value received from a user using a graphical user interface. In some embodiments, the lateral out-of-view shift threshold can include, for example, loaded from an editable configuration file.

Figure 9:
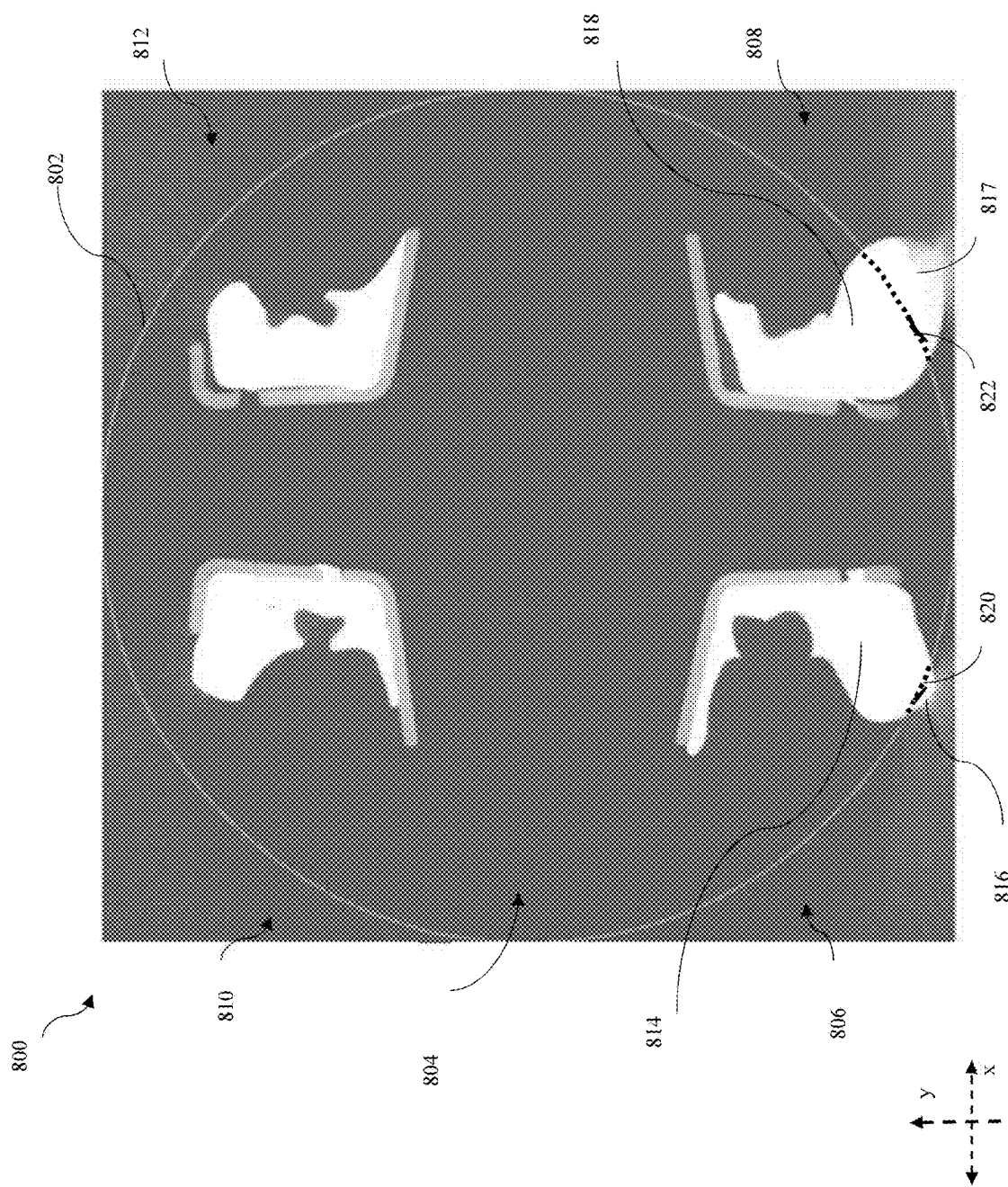
FIG. 9 shows an example of a 2D horizontal slice of a reconstructed projection image.

FIG. 9 illustrates an example of a horizontal slice 800. The lighter colored pixels (white for example) depict material with a density above the iso-value of density. Darker colored pixels represent, for example, material with density below the iso-value of density. In this example, the one or more scanned objects appear white in the horizontal slice 800 since their density is above the selected iso-value of density. Also illustrated is the lateral field of view boundary 802. Although shown in the figure, the lateral field of view boundary 802 may not typically be visible in the horizontal slice and is shown and emphasized here visually for illustrative purposes. As discussed previously, the reconstruction within an interior region 804 of the lateral field of view boundary 802 is accurate. Reconstructed regions exterior to the lateral field of view boundary 802 such as first exterior region 806, second exterior region 808, third exterior region 810, and fourth exterior region 812 may not contain accurately reconstructed data. For example, a first reconstructed object portion 814 includes a first extension region 816 extending into exterior first exterior region 806 and a second reconstructed objection portion 818 that includes a second extension region 817 extending into second exterior region 808. Because the first extension region 816 and the second extension region 817 are exterior to the lateral field of view boundary 802, they may be inaccurate reconstructions. The computer-implemented method can determine a first arc intersection 820 between the first reconstructed object portion 814 and the lateral field of view boundary 802 and a second arc intersection 822 between the second reconstructed portion 818 and the lateral field of view boundary 802. The computer-implemented method can determine the length of each arc to determine the longest arc in the horizontal slice 800. In this example, second arc intersection 822 is determined to be the longest in this horizontal slice 800. The computer-implemented method can load one more additional horizontal slices, determine arc intersections between their lateral field of view and any reconstructed object portions and determine the longest arc intersection for each horizontal slice. The computer-implemented method can determine if the second arc intersection 822 is the longest arc intersection compared to all arc intersections from one or more horizontal slices. The computer-implemented method can determine if the second arc intersection 822 is at or above the lateral out of view threshold value. For example, if the second arc intersection 822 is at or above a user configurable lateral out of view threshold value such as 4% or greater of the circumference of the lateral field of view boundary 802, then the computer-implemented method can determine that the scanned objects were out of view laterally during scanning. If, on the other hand, the second arc intersection 822 is below the lateral out of view threshold value, then the computer-implemented method can determine that the one or more scanned objects were not laterally out of view.

Figure 10:
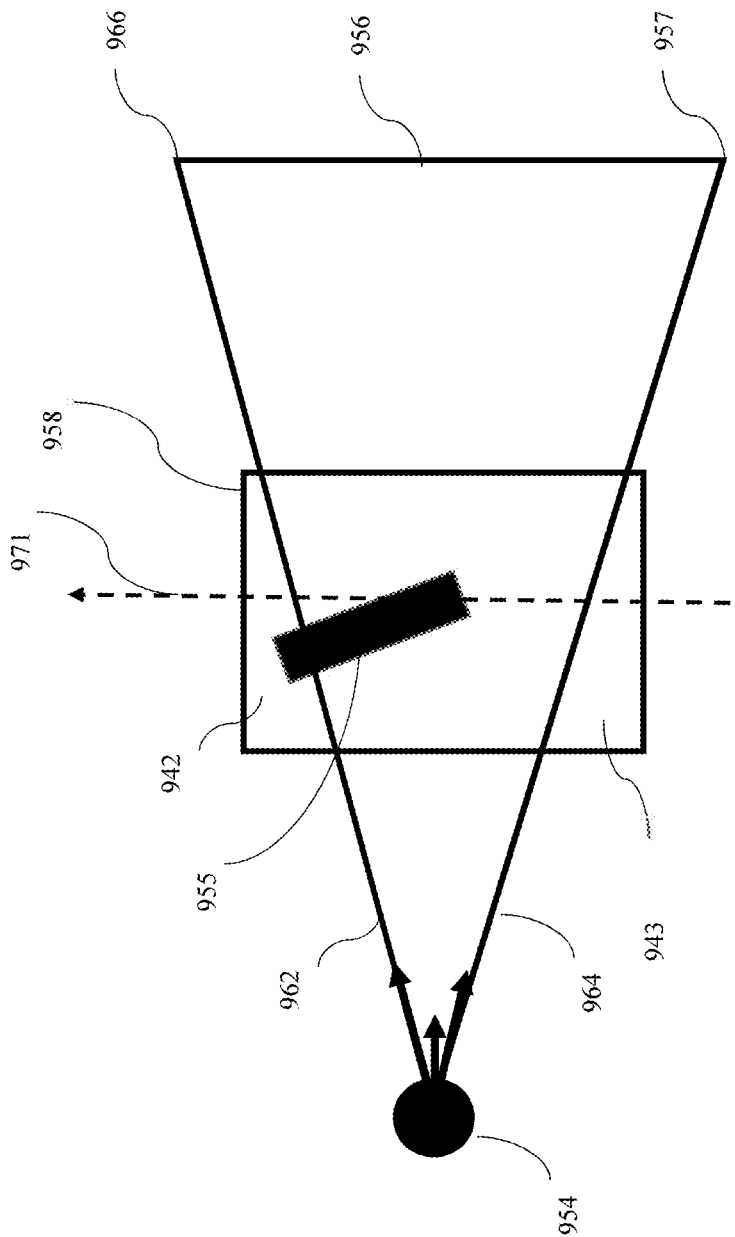
FIG. 10 shows an example of a schematic 2D diagram illustration of an example CT scanning system viewed from the side.

In some embodiments, the computer-implemented method can determine whether one or more portions of the object(s) are vertically out-of-shift. Vertical out-of-view shifts can occur where at least a portion of one or more objects being scanned are outside of the view-cylinder boundary vertically, or in a z direction, for example. As illustrated in FIG. 10, regions such as vertical out-of-view regions 942 and 943 are not detected by the detector 956 since they do not fall within the x-ray field of view bounded (in the x-z plane) by a first boundary 962 extending between the x-ray source 954 and a first detector edge 966, by a second boundary 964 extending between the x-ray source 954 and a second detector edge 957, and by the detector 956. If any portion of the one or more objects being scanned extends into the vertical out-of-view regions 942 and 943 at one or more rotational positions as the object is rotated around an axis of rotation 971 during scanning, then the object is considered vertically out-of-view. For example, as illustrated in the FIG. 10, at least a portion of the object at rotational position 955 extends into a lateral out-of-view region 942. When the object scan is reconstructed to generate the reconstructed voxel image 958, the vertically out-of-view region's digital surface in the voxel file can be either missing, distorted, blurry, or inaccurate, even if reconstruction algorithms attempt to fill in the missing data at the rotational position 955. This distortion can occur even if the at least portion is within the x-ray field of view at another rotational position such as rotational position. This type of vertical out-of-view shift in the z plane (horizontal or sideways shift) can be referred to as a vertical out of view shift since it occurs in the z plane as shown in the figure.

Figure 11:
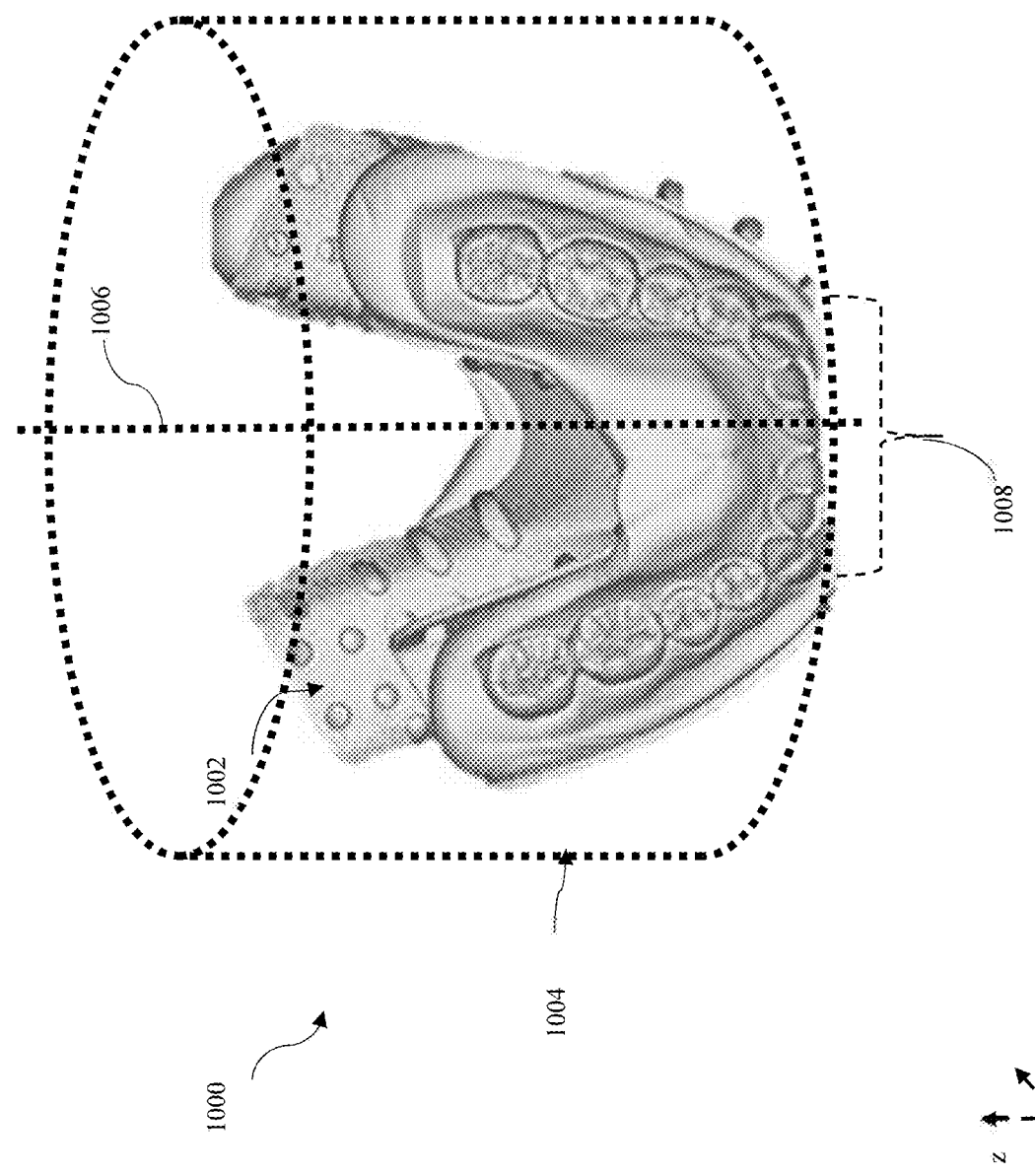
FIG. 11 shows an example of a 3D digital model with at least one vertical out of view portion.

FIG. 11 illustrates an example of a digital model 1000 with an iso-surface 1002. Also depicted for illustration purposes is view cylinder boundary 1004 and an axis of rotation 1006. As illustrated in the figure, an out-of-view portion 1008 arises because the object was not within the view cylinder boundary 1004 vertically or in the z direction at at least one rotational position. In this example, the out-of-view portion 1008 was due to a vertical out-of-view shift of the object. This can refer to, for example, placement of the object outside of the view cylinder anywhere vertically, or in the z axis.

Figure 12:
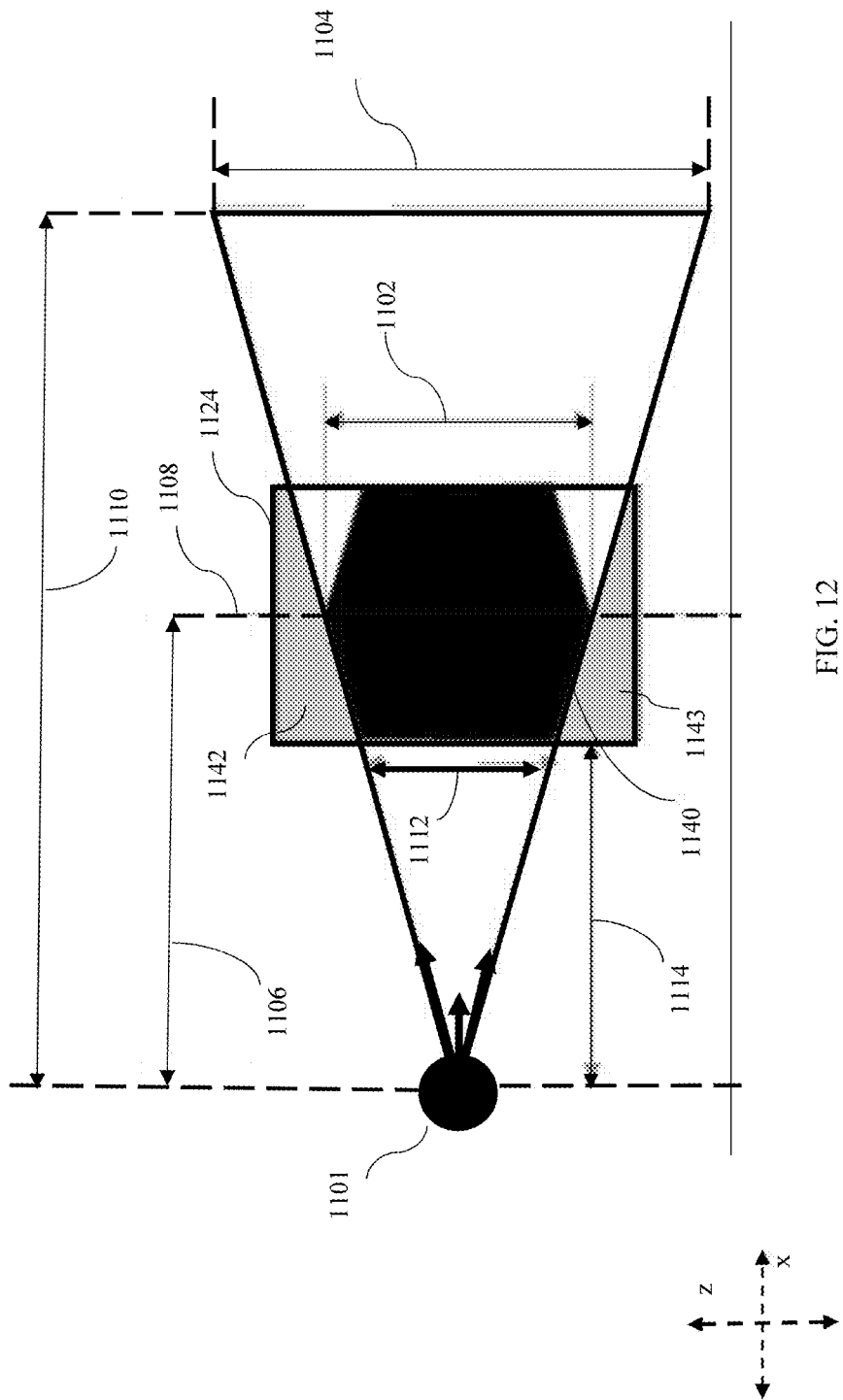
FIG. 12 shows an example of a schematic 2D diagram illustration of an example CT scanning system viewed from the side.

In some embodiments, the computer-implemented method can determine a vertical field of view boundary of the view cylinder boundary. In some embodiments, the vertical field of view boundary can be in the x-z plane, for example. In some embodiments, the vertical field of view boundary can be a cylinder having a pointed top and bottom, for example, as illustrated in FIG. 12. For example, in some embodiments, the computer-implemented method can determine a vertical field of view boundary as:

(1) a maximum height 1102 from tip to tip equal to: (a detector height 1104)*(source-to-axis 1108 distance 1106)/(source-to-detector distance 1110), with source 1101 as illustrated in the figure.

(2) a cylinder height 1112 of the cylinder part, where its horizontal slice area is maximal is equal to (height of the detector 1104)*(source-to-cylinder distance 1114)/(source-to-detector distance 1110), with source 1101, as illustrated in the figure.

The reconstruction volume 1124 can be generated using standard reconstruction techniques known in the art, for example. In some embodiments, the computer-implemented method can determine a vertical out of view shift where one or more portions of one or more objects reside outside of the vertical field of view boundary 1140 at any rotational position of the object. In some embodiments, a vertical out of view shift can occur when at least a portion of an object extends into for example a top out of view region 1142 and/or a bottom out of view shift region 1143 in at least one rotational position.

Figure 13:
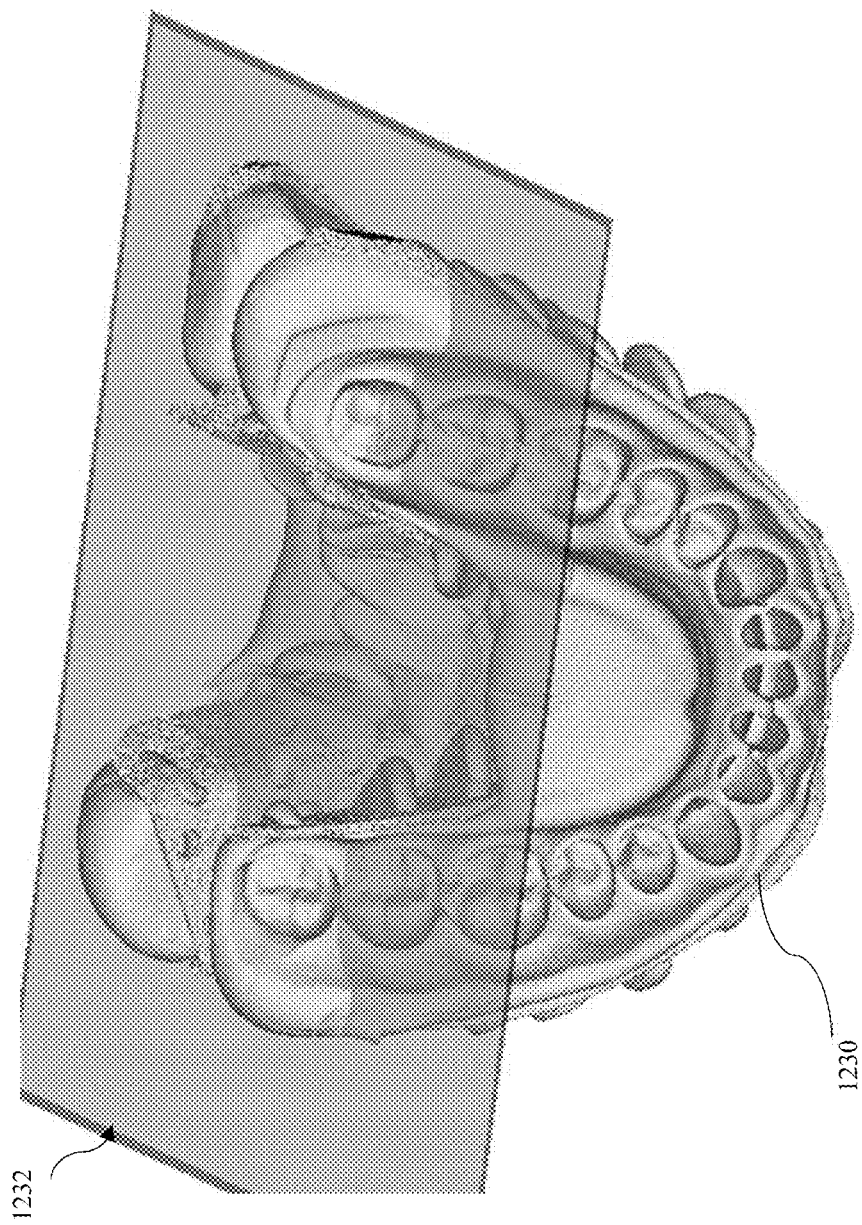
FIG. 13 shows an example of a 3D digital model with at least one vertical out of view portion.

In some embodiments, the computer-implemented method can determine a top out-of-view shift. A top out of view shift can occur in some embodiments, when one or more portions of one or more scanned objects reside outside the vertical field of view in top out of view region 1142, for example. The top out of view region 1142 can be the highest out view region along the z-axis, for example. In some embodiments, the computer-implemented method can determine a top out-of-view shift by loading a top horizontal slice of the voxel density file and evaluating the top horizontal slice of the voxel density file to determine whether the number of pixels above the threshold iso-value exceeds a top out-of-view shift threshold. In some embodiments, where the object is a physical dental impression, for example, the top out-of-view shift threshold can be, for example, at least 5% of the total pixels in the horizontal slice. In some embodiments, the top out-of-view shift threshold can be, for example, input by a user using a graphical user interface. In some embodiments, the top out-of-view shift threshold can be, for example, loaded from an editable configuration file. For example, FIG. 13 illustrates a top out of view region above plane 1232 for digital surface 1230. The computer-implemented method can load a horizontal slice of the voxel density file at the threshold iso-value that provides the digital surface 1230 and determine whether the number of pixels above the threshold iso-value exceeds a top out-of-view shift threshold.

In some embodiments, the computer-implemented method can evaluate by include determining a bottom out-of-view shift. In some embodiments, determining the bottom out-of-view shift can include evaluating a bottom horizontal slice of the voxel density file to determine whether the number of pixels above the threshold iso-value exceeds a bottom out-of-view shift threshold. In some embodiments, the bottom out-of-view shift threshold can include, for example, at least 8%. For example, the computer-implemented method can determine bottom out of view of at least 8% of the bottom horizontal slice comprises pixels representing the one or more scanned objects.

Figure 14A:
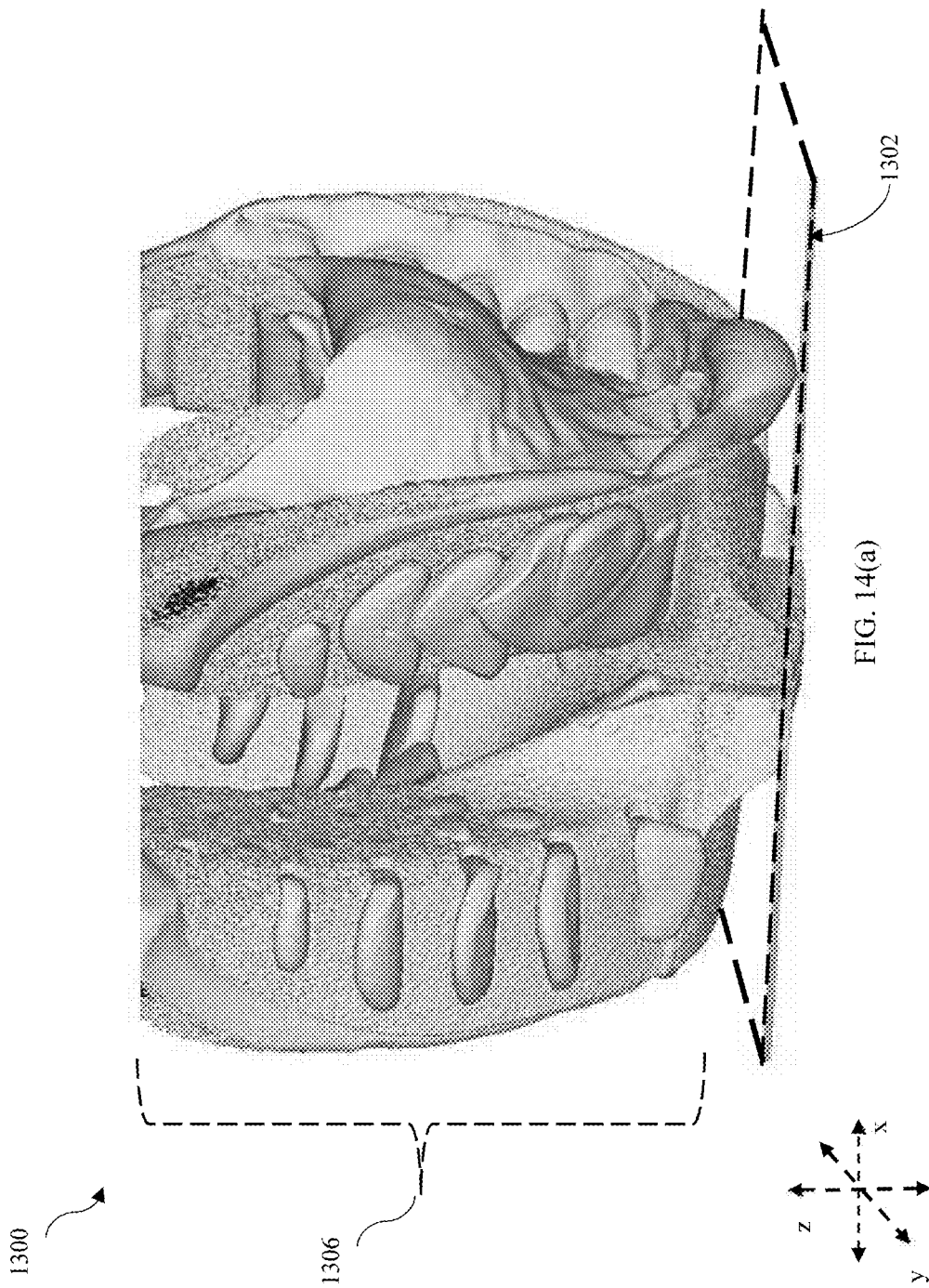
FIG. 14(a) shows an example of a 3D digital model with a bottom region not out of view.
Figure 14B:
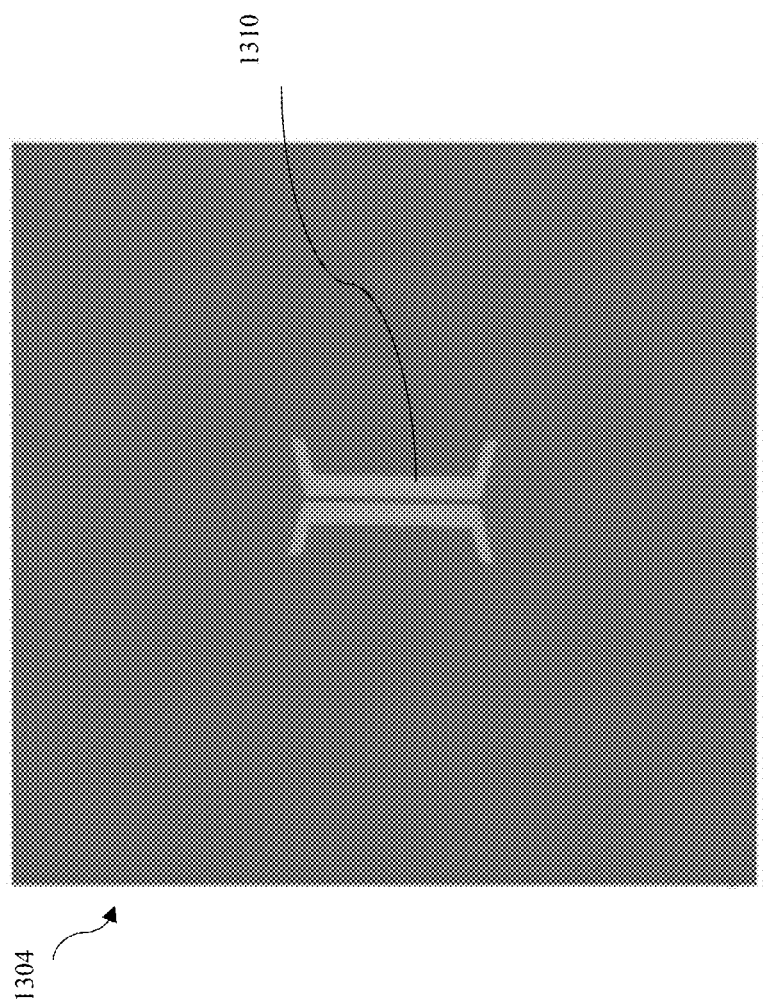
FIG. 14(b) shows an example of a 2D cross section of a bottom horizontal slice that is not out of view.
Figure 14C:
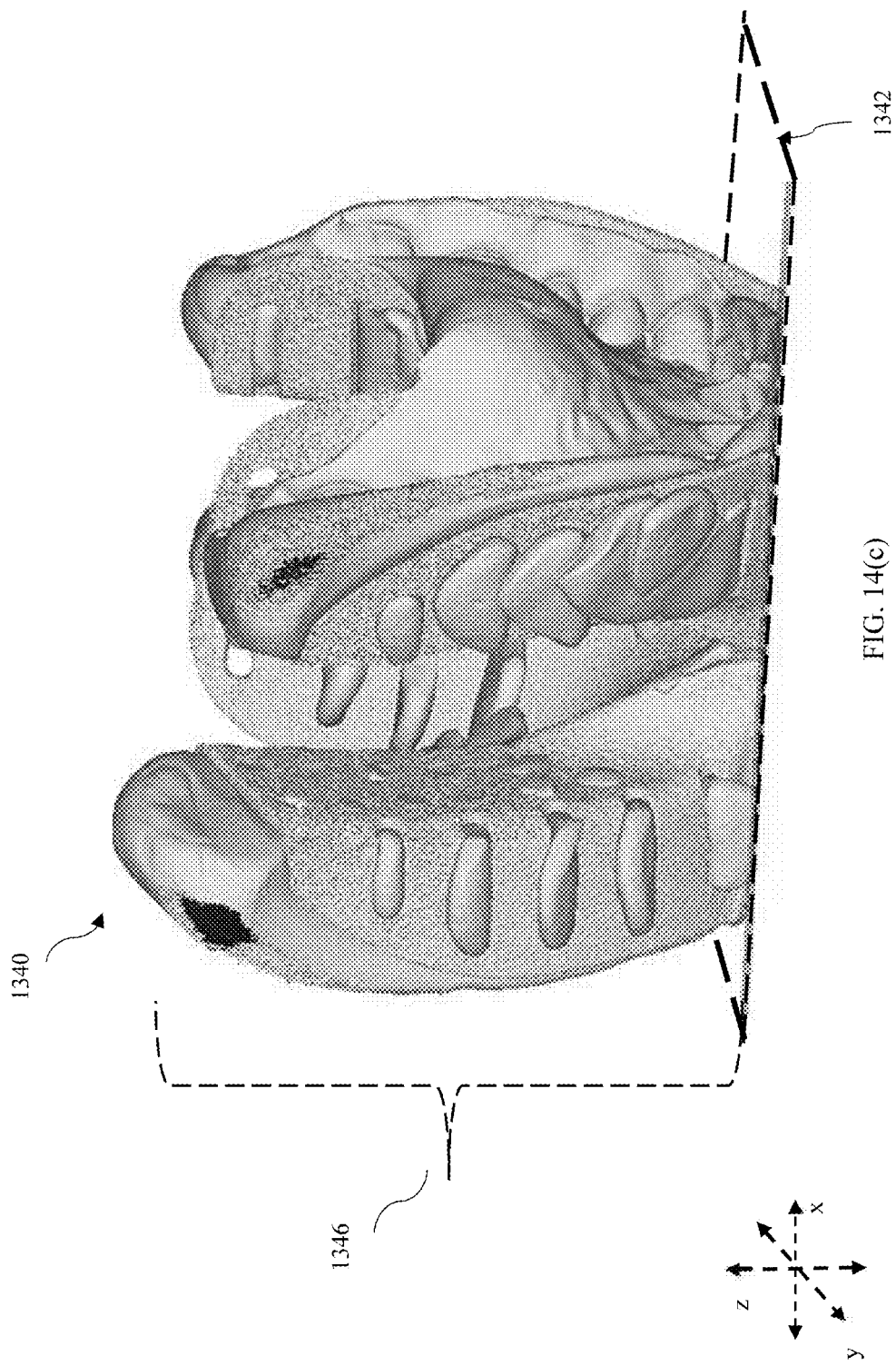
FIG. 14(c) shows an example of an example a 3D digital model with a bottom region out of view.
Figure 14D:
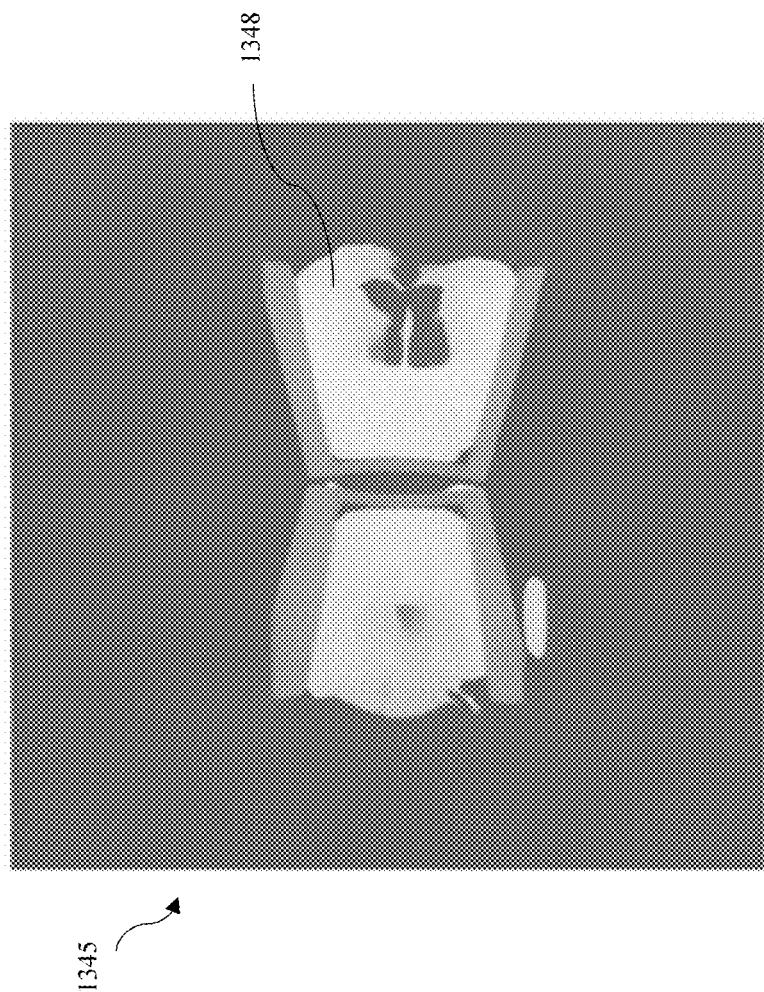
FIG. 14(d) shows an example of an example of a 2D cross section of a bottom horizontal slice that is out of view.

For example, FIG. 14(a) shows an illustration of a digital model 1300. A bottom region 1302 appearing as bottom horizontal slice 1304 in FIG. 14(b) is shown for illustrative purposes. As can be seen in the example of FIG. 14(a), the bottom region 1302 does not intersect a region of interest 1306, which can include the impression regions in some embodiments, for example, in the case of scanning dental impressions. FIG. 14(b) illustrates a bottom horizontal slice 1304 of the bottom region 1302 from FIG. 14(a). The computer-implemented method can, for example, can count and determine that the number of pixels 1310 (shown in lighter pixel colors) in the bottom horizontal slice 1304 are below a bottom out of view shift threshold, for example, such as 8% of the total number of pixels. FIG. 14(c) illustrates a digital model 1340. A bottom region 1342 appearing as bottom horizontal slice 1345 in FIG. 14(d) is shown for illustrative purposes. As can be seen in the example of FIG. 14(c), the bottom region 1342 intersects a region of interest 1346, which can include the impression regions in some embodiments, for example where the object scanned is a dental impression. FIG. 14(d) illustrates a bottom horizontal slice 1345 of the bottom region 1342 from FIG. 14(c). The computer-implemented method can, for example, determine that the number of pixels 1348 (shown in lighter pixel colors) in the bottom horizontal slice 1304 are at or above a bottom out of view shift threshold, for example, such as 8% of the total number of pixels. The computer-implemented method can determine that the scan was out of view in this example. In some embodiments, the bottom out-of-view shift threshold can be, for example, input by a user using a graphical user interface. In some embodiments, the bottom out-of-view shift threshold can be, for example, loaded from an editable configuration file.

In some embodiments, the lateral out of view threshold, top out-of-view shift threshold value and bottom out-of-view threshold values can each be based on the type of objects being scanned. For example, minor/irrelevant parts of an object can be allowed to reside outside of the lateral field of view and/or vertical field of view without triggering an out-of-view error.

For example, in the case of dental impressions, the non-impression portions of the dental impression can be outside of the lateral field of view and/or the vertical field of view. In the case of the vertical field of view, in some embodiments, top out-of-view threshold values can be at least 5% of the total number of pixels for dental impressions, for example and the bottom out of view threshold can be at least 8% of the total number of pixels, for example. In some embodiments, the bottom out of view threshold is greater than the top out of view threshold. This can be because some objects may be on a mounting object which does not contain relevant data. The mounting object can add to the total number of object pixels (or white pixels, for example) in the bottom horizontal slice. Allowing a higher bottom out of view threshold can help account for the mount. In the case of the lateral field of view, the lateral out of view threshold can be, for example at least 4% of the total lateral field of view boundary as discussed previously.

Figure 15:
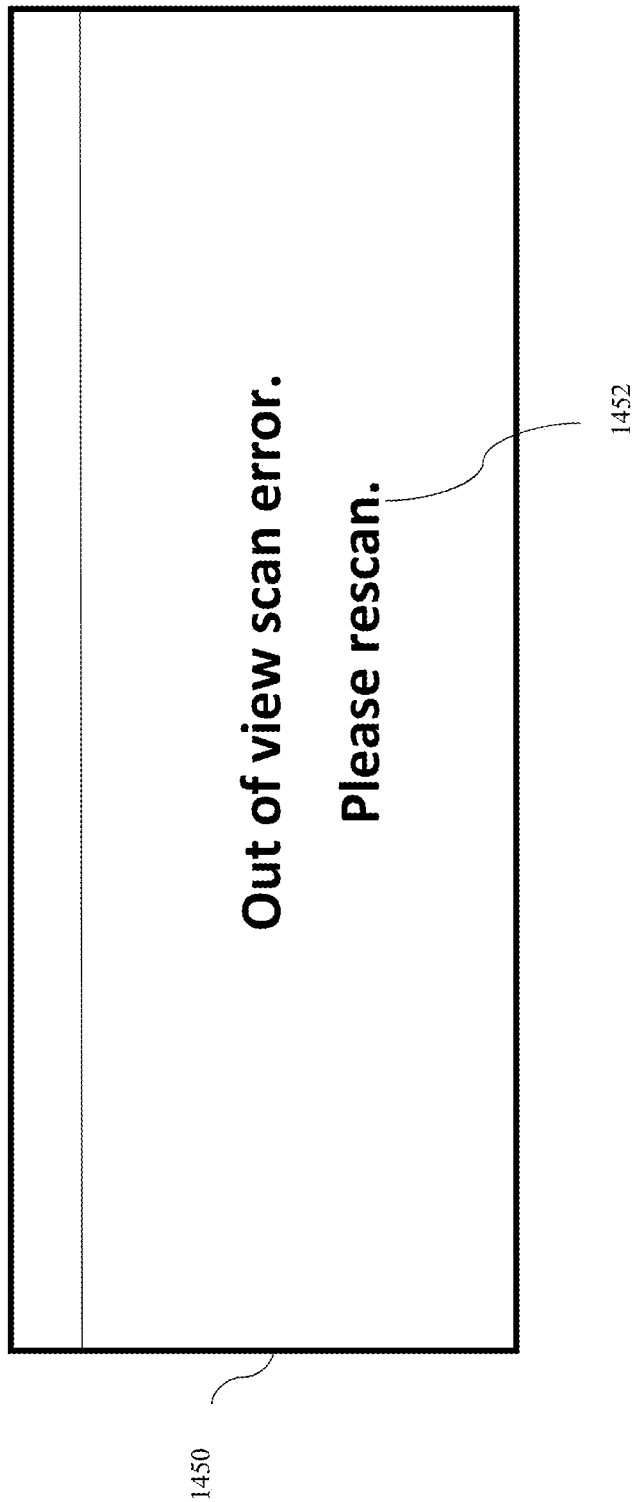
FIG. 15 shows an example of a graphical user interface alert displayed on a screen or display.

In some embodiments, the computer-implemented method can present an indication of the out-of-view scan. This can include in some embodiments of issuing an alert to a display that can be viewed by an operator. FIG. 15 illustrates an example of a graphical user interface (GUI) that presents an alert window 1450 with a message 1452 on a display. Although a particular message is shown, this is for illustrative purposes only; any alert message can be presented. The alert window 1450 can alert/instruct the operator of the out-of-view scan in some embodiments, and to re-scan the one or more objects and/or take other suitable steps.

In some embodiments, one or more features described herein can be performed automatically. For example, the detection can include, for example, performed automatically.

In some embodiments, the scanned object can include a physical dental impression. In some embodiments, the physical dental impression can include a triple tray. In some embodiments, the physical dental impression can includes a full arch. In some embodiments, the physical dental impression can include a double full arch. In some embodiments, the physical dental impression can be of any type.

One or more advantages of one or more features disclosed herein can include, for example, determining out of view scans empirically, quickly, and in real-time. This can, for example, allow out-of-scan detection immediately after the scan, so that the one or more out-view objects can be rescanned by the operator right away. This can, for example, help prevent delay in discovering an out-of-view scan, when the one or more objects may not be immediately accessible or available for rescanning. Another advantage can include scalability, for example. For example, one or more features as disclosed herein can determine out-of-view scans for any number of projection images and any number of scans. Another advantage of one or more features can include, for example, automatically detecting an out-of-view scan without the need for human input. This can free up an operator to perform other tasks, thereby improving scanning efficiency, for example. One or more advantages can include, for example, empirically determining whether the physical object was placed within the x-ray field of view to encounter x-rays that hit the detector at every rotation position, and thereby provide an indication of the accuracy of scan and reconstruction. Another advantage can include, for example, determining out of view scans, thereby reducing the number of tomographic reconstructions having missing, inaccurate, blurry, and/or difficult to see regions.

Figure 16:
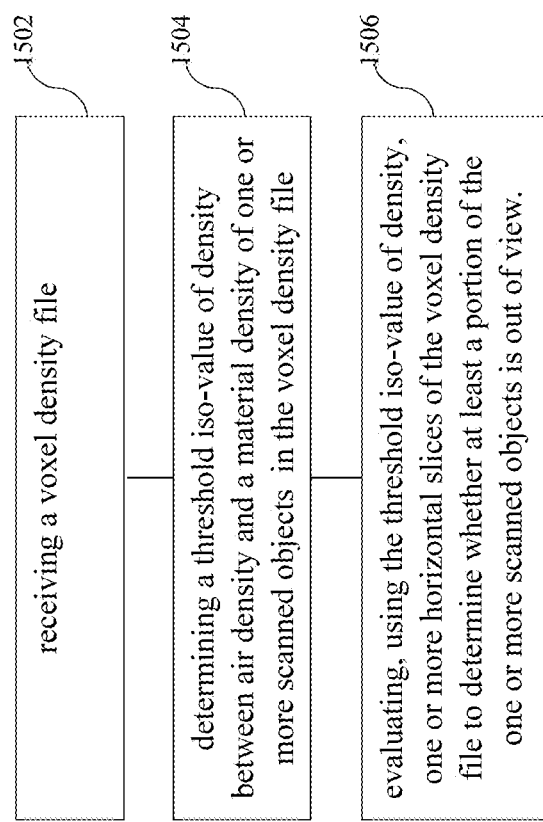
FIG. 16 shows an example of a flowchart.

FIG. 16 illustrates an example in some embodiments of a computer-implemented method to automatically detect an out-of-view CT scan. The method can include receiving a voxel density file at 1502, determining a threshold iso-value of density between air density and a material density of one or more scanned objects in the voxel density file at 1504; and evaluating, using the threshold iso-value of density, one or more horizontal slices of the voxel density file to determine whether at least a portion of the one or more scanned objects is out of view at 1506.

The method can include one or more of the following optional features. Evaluating include determining a lateral out-of-view shift. Determining a lateral out-of-view shift can include determining a horizontal slice comprising a longest continuous arc of intersection between a view cylinder boundary and voxels above the threshold iso-value of density can be above a lateral out-of-view shift threshold. The lateral out-of-view shift threshold can include a percentage of the longest continuous arc of intersection length of a view cylinder boundary length. The lateral out-of-view shift threshold can be at least 4%. Evaluating can include determining a top out-of-view shift. Determining the top out-of-view shift can include evaluating a top horizontal slice of the voxel density file to determine whether the number of pixels above the threshold iso-value exceeds a top out-of-view shift threshold. The top out-of-view shift threshold can be at least 5%. Evaluating can include determining a bottom out-of-view shift. Determining the bottom out-of-view shift can include evaluating a bottom horizontal slice of the voxel density file to determine whether the number of pixels above the threshold iso-value exceeds a bottom out-of-view shift threshold. The bottom out-of-view shift threshold can be at least 8%. The method can further include notifying an operator of the out-of-view scan. The detection can be performed automatically. The one or more scanned objects can include one or more physical dental impressions.

Some embodiments include a non-transitory computer readable medium storing executable computer program instructions for automatically detecting an out-of-view CT scan, the computer program instructions comprising instructions for: receiving a voxel density file; determining a threshold iso-value of density between air density and a material density of one or more scanned objects in the voxel density file; evaluating, using the threshold iso-value of density, one or more horizontal slices of the voxel density file to determine whether at least a portion of the one or more scanned objects is out of view.

Some embodiments include a computer-implemented system of automatically detecting an out-of-view CT scan, including: a processor; a computer-readable storage medium comprising instructions executable by the processor to perform steps comprising: receiving a voxel density file; determining a threshold iso-value of density between air density and a material density of one or more scanned objects in the voxel density file; evaluating, using the threshold iso-value of density, one or more horizontal slices of the voxel density file to determine whether at least a portion of the one or more scanned objects is out of view.

Figure 17:
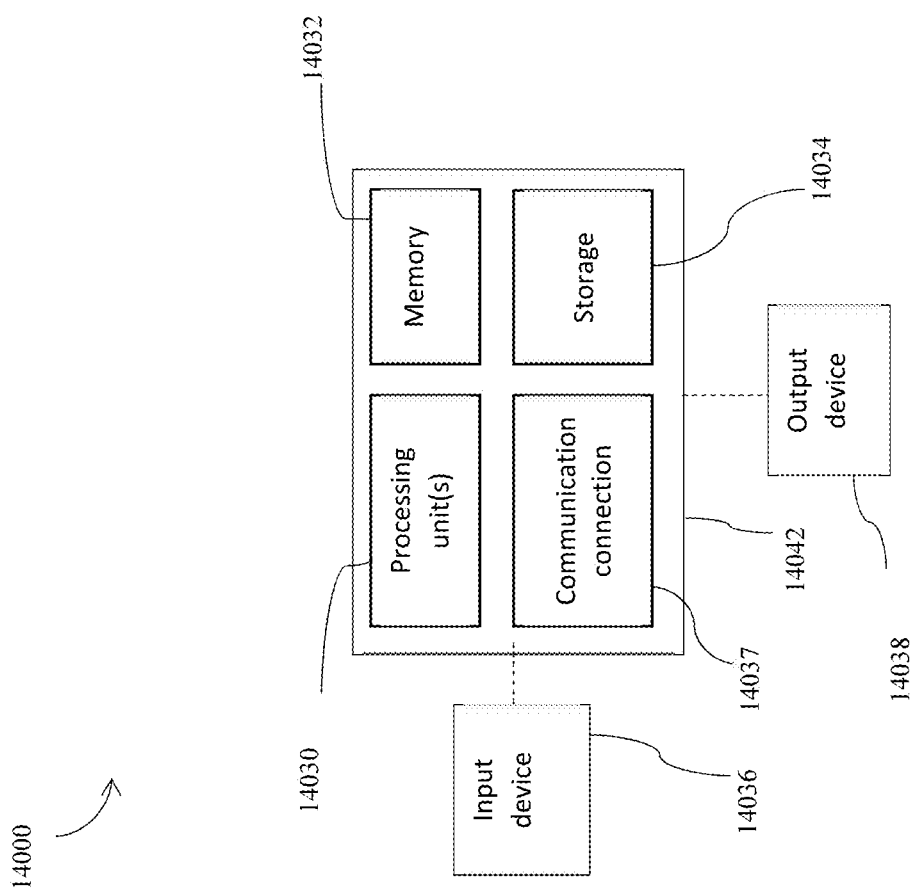
FIG. 17 is a diagram illustrating a system in some embodiments.

FIG. 17 illustrates a processing system 14000 in some embodiments. The system 14000 can include a processor 14030, computer-readable storage medium 14034 having instructions executable by the processor to perform one or more steps described in the present disclosure.

One or more of the features disclosed herein can be performed and/or attained automatically, without manual or user intervention. One or more of the features disclosed herein can be performed by a computer-implemented method. The features, including but not limited to any methods and systems disclosed may be implemented in computing systems. For example, the computing environment 14042 used to perform these functions can be any of a variety of computing devices (e.g., desktop computer, laptop computer, server computer, tablet computer, gaming system, mobile device, programmable automation controller, video card, etc.) that can be incorporated into a computing system comprising one or more computing devices. In some embodiments, the computing system may be a cloud-based computing system.

For example, a computing environment 14042 may include one or more processing units 14030 and memory 14032. The processing units execute computer-executable instructions. A processing unit 14030 can be a central processing unit (CPU), a processor in an application-specific integrated circuit (ASIC), or any other type of processor. In some embodiments, the one or more processing units 14030 can execute multiple computer-executable instructions in parallel, for example. In a multi-processing system, multiple processing units execute computer-executable instructions to increase processing power. For example, a representative computing environment may include a central processing unit as well as a graphics processing unit or co-processing unit. The tangible memory 14032 may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage 14034, one or more input devices 14036, one or more output devices 14038, and one or more communication connections 14037. An interconnection mechanism such as a bus, controller, or network, interconnects the components of the computing environment. Typically, operating system software provides an operating environment for other software executing in the computing environment, and coordinates activities of the components of the computing environment.

The tangible storage 14034 may be removable or non-removable and includes magnetic or optical media such as magnetic disks, magnetic tapes or cassettes, CD-ROMs, DVDs, or any other medium that can be used to store information in a non-transitory way and can be accessed within the computing environment. The storage 14034 stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. For video encoding, the input device(s) may be a camera, video card, TV tuner card, or similar device that accepts video input in analog or digital form, or a CD-ROM or CD-RW that reads video samples into the computing environment. The output device(s) may be a display, printer, speaker, CD-writer, or another device that provides output from the computing environment.

The communication connection(s) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media 14034 (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers) (e.g., the computer-executable instructions cause one or more processors of a computer system to perform the method). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media 14034. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosure may be applied, it should be recognized that the illustrated embodiments are only examples and should not be taken as limiting the scope of the disclosure.

What is claimed is:

1. A computer-implemented method to automatically detect an out-of-view CT scan, comprising:
   receiving a voxel density file;
   determining a threshold iso-value of density between air density and a material density of one or more scanned objects in the voxel density file; and
   evaluating, using the threshold iso-value of density, one or more horizontal slices of the voxel density file to determine whether at least a portion of the one or more scanned objects is out of view,
   wherein evaluating comprises determining a lateral out-of-view shift,
   wherein determining a lateral out-of-view shift comprises determining a horizontal slice comprising a longest continuous arc of intersection between a view cylinder boundary and voxels above the threshold iso-value of density is above a lateral out-of-view shift threshold.

2. The method of claim 1, wherein the lateral out-of-view shift threshold comprises a percentage of the longest continuous arc of intersection length of a view cylinder boundary length.

3. The method of claim 1, wherein the lateral out-of-view shift threshold is at least 4%.

4. The method of claim 1, wherein evaluating comprises determining a top out-of-view shift.

5. The method of claim 4, wherein determining the top out-of-view shift comprises evaluating a top horizontal slice of the voxel density file to determine whether the number of pixels above the threshold iso-value exceeds a top out-of-view shift threshold.

6. The method of claim 5, wherein the top out-of-view shift threshold is at least 5%.

7. The method of claim 1, wherein evaluating comprises determining a bottom out-of-view shift.

8. The method of claim 7, wherein determining the bottom out-of-view shift comprises evaluating a bottom horizontal slice of the voxel density file to determine whether the number of pixels above the threshold iso-value exceeds a bottom out-of-view shift threshold.

9. The method of claim 8, wherein the bottom out-of-view shift threshold is at least 8%.

10. The method of claim 1, further comprising notifying an operator of the out-of-view scan.

11. The method of claim 1, wherein the detection is performed automatically.

12. The method of claim 1, wherein the one or more scanned objects comprises one or more physical dental impressions.

13. A system of automatically detecting an out-of-view CT scan, comprising:
    a processor;
    a computer-readable storage medium comprising instructions executable by the processor to perform steps comprising:
    receiving a voxel density file;
    determining a threshold iso-value of density between air density and a material density of one or more scanned objects in the voxel density file; and
    evaluating, using the threshold iso-value of density, one or more horizontal slices of the voxel density file to determine whether at least a portion of the one or more scanned objects is out of view,
    wherein evaluating comprises determining a lateral out-of-view shift.

14. The system of claim 13, wherein evaluating comprises determining a vertical out-of-view shift.

15. A non-transitory computer readable medium storing executable computer program instructions for automatically detecting an out-of-view CT scan, the computer program instructions comprising instructions for:
    receiving a voxel density file;
    determining a threshold iso-value of density between air density and a material density of one or more scanned objects in the voxel density file; and
    evaluating, using the threshold iso-value of density, one or more horizontal slices of the voxel density file to determine whether at least a portion of the one or more scanned objects is out of view,
    wherein evaluating comprises determining a lateral out-of-view shift.

16. The medium of claim 15, wherein evaluating comprises determining a vertical out-of-view shift.

* * * * *